United States Patent [19]
Mages et al.

[11] Patent Number: 5,892,825
[45] Date of Patent: Apr. 6, 1999

[54] METHOD OF SECURE SERVER CONTROL OF LOCAL MEDIA VIA A TRIGGER THROUGH A NETWORK FOR INSTANT LOCAL ACCESS OF ENCRYPTED DATA ON LOCAL MEDIA

[76] Inventors: Kenneth G. Mages, 1671 Strath Erin, Highland Park, Ill. 60035; Jie Feng, 1414 Ebmwood, #3E, Evanston, Ill. 60201

[21] Appl. No.: 756,162

[22] Filed: Nov. 25, 1996

Related U.S. Application Data

[63] Continuation-in-part of Ser. No. 645,022, May 15, 1996, abandoned.

[51] Int. Cl.$^6$ .................................................. H04L 9/08
[52] U.S. Cl. ...................... 380/3; 380/4; 380/5; 380/21
[58] Field of Search ...................................... 380/3–5, 21

[56] References Cited

U.S. PATENT DOCUMENTS

| | | | |
|---|---|---|---|
| 3,829,833 | 8/1974 | Freeny, Jr. | 340/149 R |
| 3,911,397 | 10/1975 | Freeny, Jr. | 340/147 MD |
| 3,924,065 | 12/1975 | Freeny, Jr. | 178/66 R |
| 3,946,220 | 3/1976 | Brobeck et al. | 235/168 |
| 3,970,992 | 7/1976 | Boothroyd et al. | 340/172.5 |
| 4,070,692 | 1/1978 | Parks | 358/107 |
| 4,071,911 | 1/1978 | Mazur | 364/900 |
| 4,112,421 | 9/1978 | Freeny, Jr. | 343/112 D |
| 4,209,787 | 6/1980 | Freeny, Jr | 343/112 R |
| 4,217,588 | 8/1980 | Freeny, Jr. | 343/112 D |
| 4,220,991 | 9/1980 | Hamano et al. | 364/405 |
| 4,232,317 | 11/1980 | Freeny, Jr. | 343/112 R |
| 4,270,182 | 5/1981 | Asija | 364/900 |
| 4,305,098 | 12/1981 | Mitchell | 358/131 |
| 4,528,643 | 7/1985 | Freeny, Jr. | 364/900 |
| 4,555,803 | 11/1985 | Hirose | 382/61 |

(List continued on next page.)

OTHER PUBLICATIONS

"Overview of CD–ROM Encryption, Copy Protection, and Metering";Disc Mfg., Inc., Oct. 19, 1996.

"CD–ROM/Online Hybrids—The Missing Link", Richard R. Reisman, CD–ROM Professional, vol. 8, No. 4, Apr. 1995.

"All Power to the Web–CD–ROM is dead , or is it", Richard R. Reisman; New York Media Association News, , Jan. 1996.

Spin Webs around a CD–ROM :The Next Generation of CD/Web Hybirds, Richard R. Reisman, Mass High Tech., Sep. 1996.

*Primary Examiner*—Salvatore Cangialosi

[57] ABSTRACT

A method of triggering video imaging and/or audio data on a "HyperCD" (CD-ROM) via a trigger through a network for instant local access of encrypted data on local media. The CD-ROM contains video/audio files that have been crippled by removing the critical information thereof. The CD-ROM also contains programs for directly and automatically connecting the end-user's computer to a targeted server (URL) a network (such as the Internet).

The method of the invention includes the separation of critical information/key from media data, the storage of encrypted keys on a remote server, the storage of crippled chunky media data on CD-ROM's, the socket-to-socket connection between the end-user's computer and the remote server and the request from user to server, the authorization and transmission of the uncrippling key through a network to the end-user's computers, the combining in RAM of the trigger and the crippled data from CD-ROM for instant rendering/playback, the storing of the uncrippling key on the end-user's computers non-volatile media for owning the data on the CD-ROM for later access authorized by the remote server. Since the uncrippling trigger is much smaller than the entire media file, it saves considerable amount of transmission time, thereby instantly combining the trigger with the crippled data on the CD-ROM, after which instantly playing the designated track from end-user's computer.

19 Claims, 7 Drawing Sheets

U.S. PATENT DOCUMENTS

| | | | |
|---|---|---|---|
| 4,577,289 | 3/1986 | Comerford et al. | 364/900 |
| 4,633,207 | 12/1986 | Best | 380/4 |
| 5,027,396 | 6/1991 | Platteter et al. | 380/4 |
| 5,222,134 | 6/1993 | Waited et al. | 380/4 |
| 5,319,705 | 6/1994 | Halter et al. | 380/4 |
| 5,321,750 | 6/1994 | Nadan | 380/20 |
| 5,365,272 | 11/1994 | Siracusa | 348/426 |
| 5,375,068 | 12/1994 | Palmer et al. | 364/514 |
| 5,388,097 | 2/1995 | Baugher et al. | 370/85.5 |
| 5,400,403 | 3/1995 | Fahn | 380/4 |
| 5,410,354 | 4/1995 | Uz | 348/426 |
| 5,410,698 | 4/1995 | Danneels et al. | 395/650 |
| 5,450,489 | 9/1995 | Ostrover et al. | 380/4 |
| 5,457,668 | 10/1995 | Hibino et al. | 380/4 |
| 5,457,746 | 10/1995 | Dolphin | 380/4 |
| 5,499,252 | 3/1996 | Watanabe | 371/40.1 |
| 5,509,070 | 4/1996 | Schull | 380/4 |
| 5,535,199 | 7/1996 | Amri et al. | 370/60 |
| 5,535,327 | 7/1996 | Verinsky et al. | 395/182.03 |
| 5,550,577 | 8/1996 | Verbiest et al. | 348/7 |
| 5,553,139 | 9/1996 | Ross et al. | 380/4 |
| 5,553,143 | 9/1996 | Ross et al. | 380/25 |
| 5,559,608 | 9/1996 | Kunihiro | 358/343 |
| 5,563,947 | 10/1996 | Kikinis | 380/4 |
| 5,613,004 | 3/1997 | Cooperman et al. | 380/4 |
| 5,629,980 | 5/1997 | Stefik et al. | 380/4 |
| 5,636,276 | 6/1997 | Brugger | 380/4 |
| 5,638,443 | 6/1997 | Stefik et al. | 380/4 |

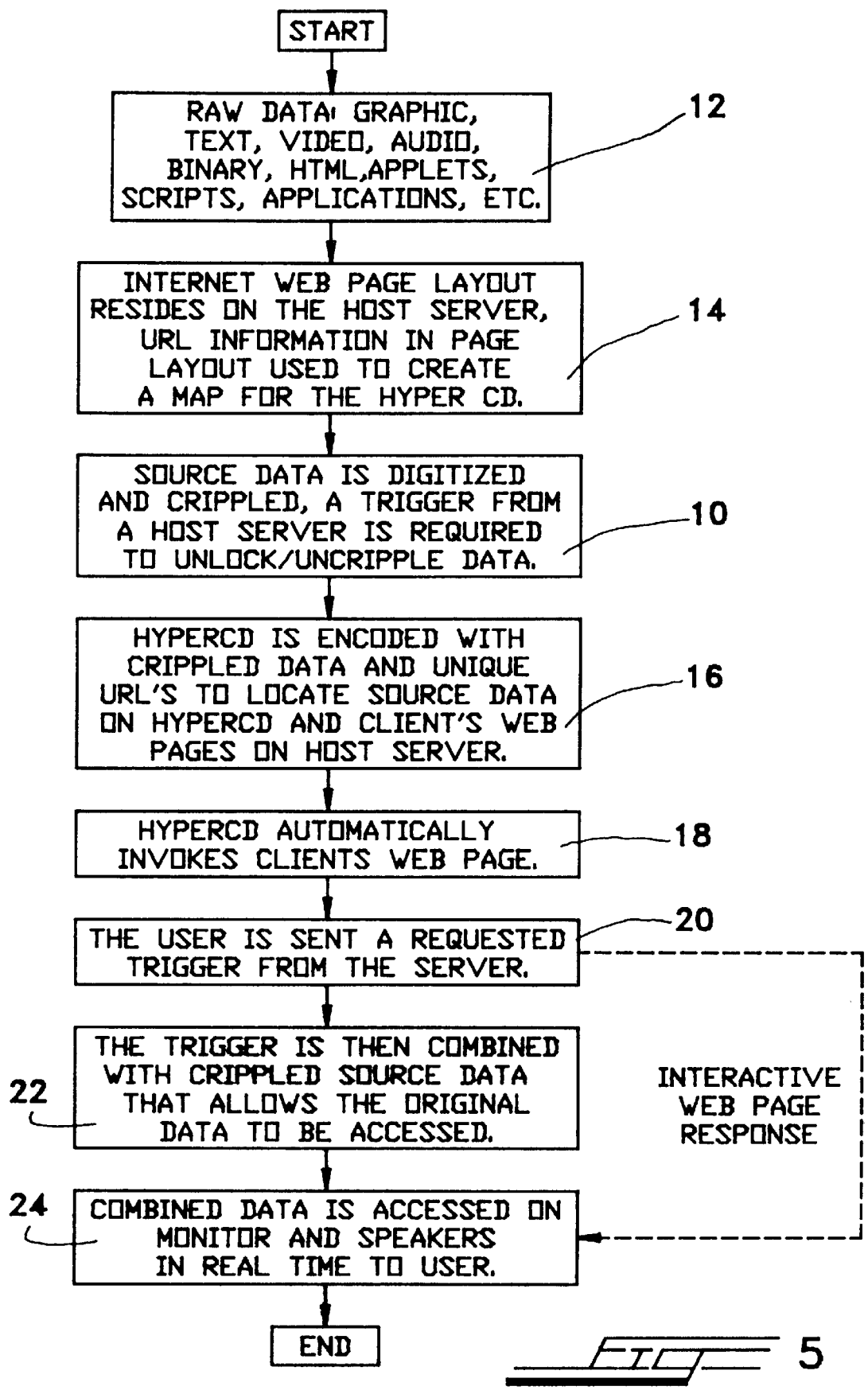

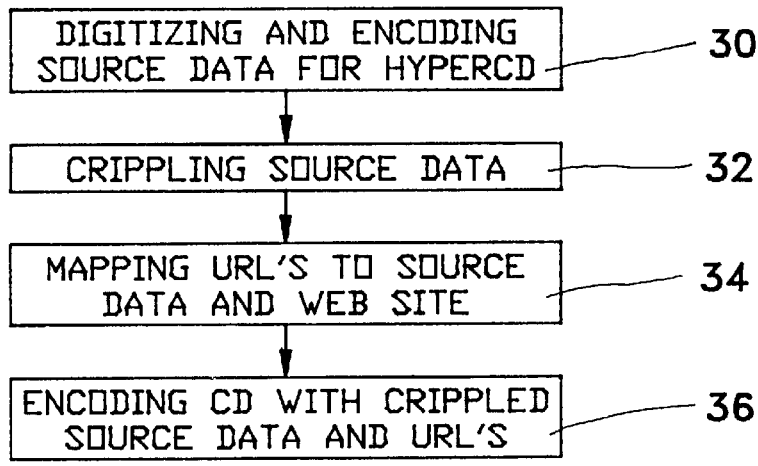
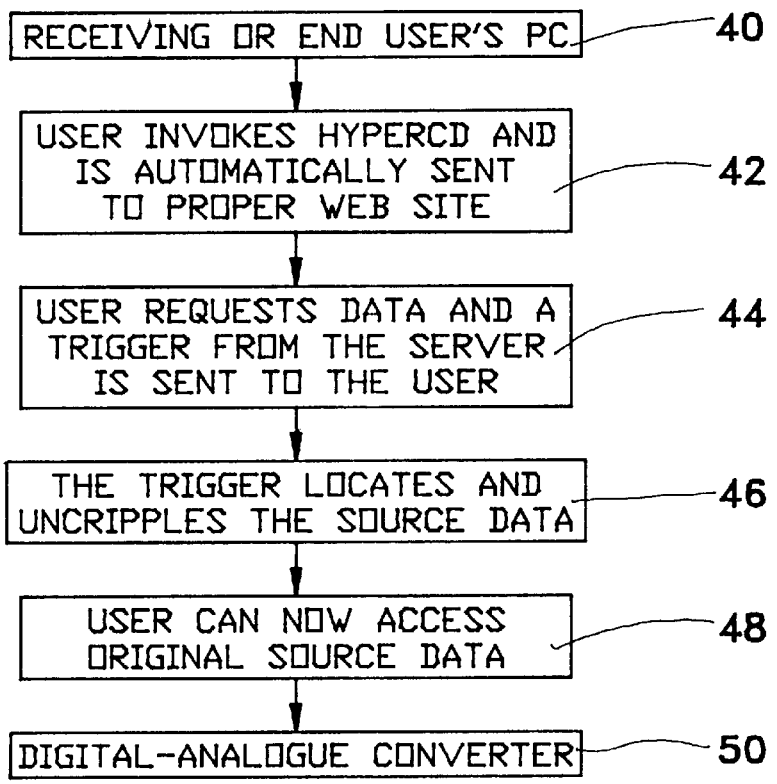

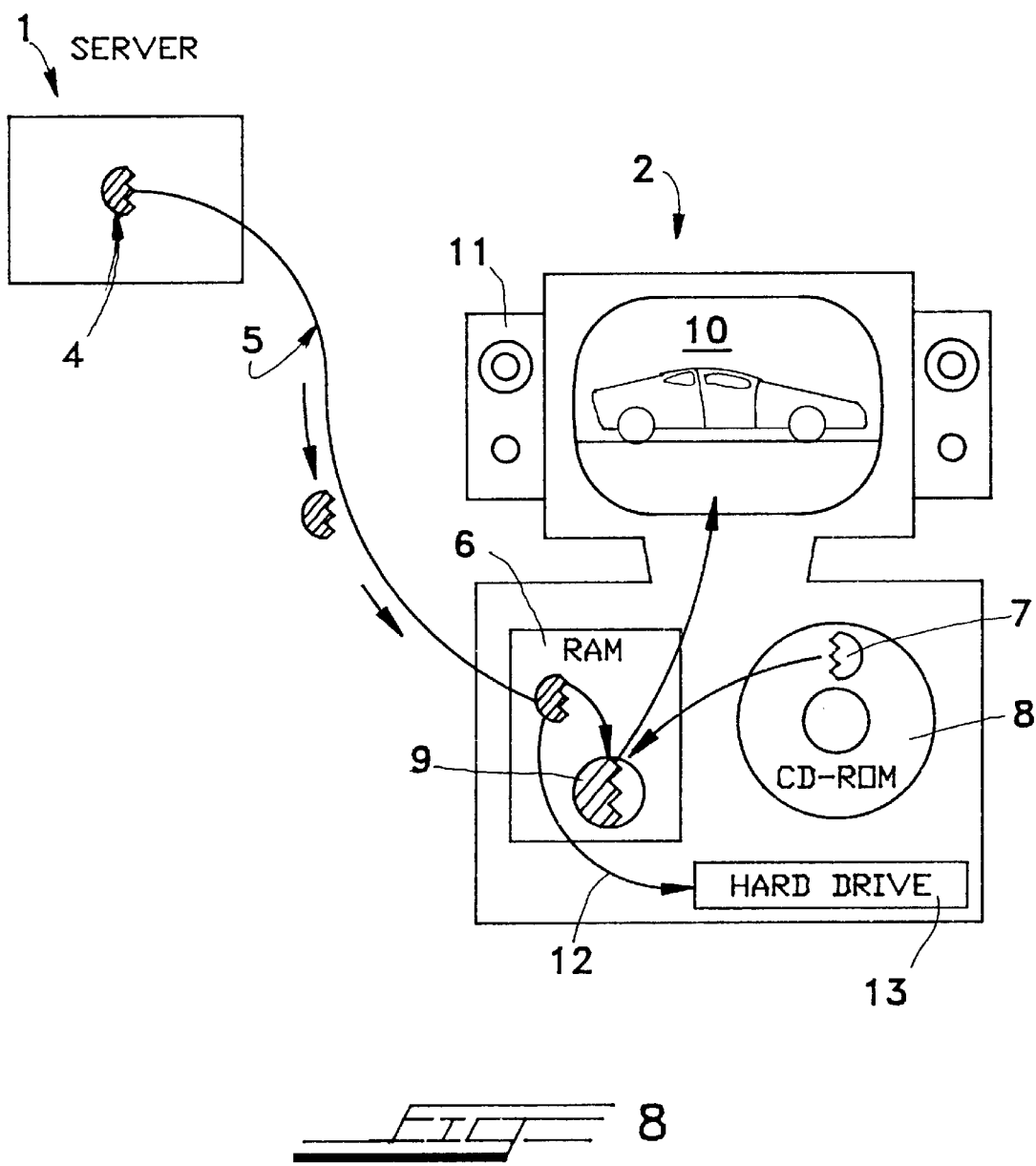

METHOD OF SECURE SERVER CONTROL OF LOCAL MEDIA VIA A TRIGGER THROUGH A NETWORK FOR INSTANT LOCAL ACCESS OF ENCRYPTED DATA ON LOCAL MEDIA

CROSS REFERENCE TO RELATED APPLICATIONS

The present application is a continuation-in-part of application Ser. No. 08/645,022, filed on May 15, 1996 now abandoned.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

BACKGROUND OF THE INVENTION

The present invention is directed to a method of transmitting "triggering data" over a network to cause video and/or audio information data on a CD-ROM at an end-user's computer to be made readable. In addition, the CD-ROM comprises program files for automatically dialing and connecting the end-user's computer to a targeted host's server using an operating system such as "Windows 95". The CD-ROM will only allow the end-user access to the video/and or audio on it by logging onto the host's server via a network such as the Internet.

The Internet is a conglomeration of computer networks that are linked together. Each network of the Internet may have one or more servers, and an operating system that may be different from that of others in the Internet. To link one network to another, and in order to overcome these operating differences between computer networks, the Internet system utilizes hardware and software devices called: bridges, routers, and gateways, all of which adapt the information being sent on one network to the operating and protocol requirements of the receiving network. For example, a gateway will connect, or "splice" a network operating on the Novell protocol to a network that operates on a DECnet or SNA protocol.

There are currently more than 10,000 computer networks that are linked together, worldwide, which together constitute the "Internet". Because they do not all operate on the same operating system, and because of different protocols, the data sent from one host computer of one network to a receiving computer of another network—which may be many thousands of miles away from the host computer—may take a relatively long time, since the gateways, bridges and routers must conform or adapt the protocol of the sending host computer to the receiving computer's protocol.

In addition to the time-delays associated with protocol variances, the Internet when connecting to an end-user via Plain Old Telephone Service (POTS), has a maximum data-transmission capacity of 3.6 kbytes per second, which is not enough for sending video images in real time.

The Internet system utilizes two types of file-transfer protocols (FTP) for copying a file from a host computer to the receiving computer: ASCII and binary. An ASCII file is a text file, while every other kind of file is binary. ASCII files are transmitted in seven-digit ASCII codes, while the binary files are transmitted in binary code. Because all data stored in computer memory is stored in binary format, when one sends a file in the Internet, it is sent in binary format. However, as discussed above, owing to the data-transmission constraints imposed by the Internet system because of the differing operating systems, and a multitude of gateways, routers, and bridges, the file data must be sent out in packets of a size no greater than 1536 bytes. Since the size of just a thirty-second video may be as great as 2.5 megabytes, it may take up to one-half hour or more to send a thirty-second video over the Internet from a host computer to a receiving computer. Presently, there are compression techniques that compress the files in order to reduce this playback-time, which data is decompressed at the receiving computer. An example of such a system is VDOLive, manufactured by VDOnet Corp. of Santa Clara, Calif. However, these compression-systems still send the data in binary format, requiring packet-data sizes of no greater than 1536 bytes. Thus, even with these compression-systems, the length of time to receive a thirty-second video over the Internet after being buffered in the user's computer is near real time, but is unstable, choppy and drops as much as 96% of the video data over a conventional phone line.

In the Internet, there is an electronic-mail delivery system called E-mail. The E-mail system utilizes addresses to direct a message to the recipient, with each address having a mailbox code and a daemon, with the mail box and daemon being separated by the symbol @. In the E-mail delivery system, all of the messages or "mail" are routed through selected routers and gateways, until it reaches what may be called a "post office" that services the recipient to whom the electronic mail is to be delivered. The "post office" is a local server. The need for these local "post offices" is because there is every reason to assume that the recipient-computer, to which the mail is being sent, is either not powered up, or is performing a different task. Since most computers in the Internet are not multi-tasking machines, such as, for example, computers running on the DOS operating system, if such a computer be engaged in performing a task, it is not possible for it to receive the E-mail data at that time. Thus, the local "post office" or server stores the message until such a time as it may be delivered to the end-user to whom it is intended.

In the E-mail system, there has really been only one format standard for Internet messages. A variation has been the MIME version, which stands for Multipurpose Internet Mail Extensions, which defines a new header-field, which is intended for use to send non-text messages, such as multi-media messages that might include audio or images, by encoding the binary into seven-digit ASCII code. Before MIME, the limitation of E-mail systems was the fact that it would limit the contents of electronic mail messages to relatively short lines of seven-bit ASCII. This has forced users to convert any non-textual data that they may wish to send into seven-bit bytes representable as printable ASCII characters before invoking a local mail UA (User Agent, a program with which human users send and receive mail). Examples of such encodings currently used in the Internet include pure hexadecimal, uuencoded, the 3-in-4 base 64 scheme specified in RFC 1421, the Andrew Toolkit Representation [ATK], and many others. Even though a user's UA may not have the capability of dealing with the non-textual body part, the user might have some mechanism external to the UA that can extract useful information from the body part. Moreover, it does not allow for the fact that the message may eventually be gatewayed back into an X.400 message handling system (i.e., the X.400 message is "tunneled" through Internet mail), where the non-textual information would definitely become useful again. With MIME, video and/or audio data may be sent using the E-mail system. MIME uses a number of header-fields, such as "Content-Type" header field, which can be used to specify the type and subtype of data in the body of a message and to fully specify the native representation (encoding) of such data; "text" Content-Type value header field, which an be used to represent textual information in a number of character sets and formatted text description languages in a standardized manner; "multi-part" Content-Type value, which can be used to combine several body parts, possibly of differing types of data, into a single message; "application" Content-Type value, which an be used to transmit application data or binary data, and hence, among other users, to implement an electronic mail file transfer service; "message" Content-Type value, for encapsulating another mail message; "image" Content-Type value, for transmitting still image (picture) data; "audio" Content-Type value, for transmitting audio or voice data; "video" Content-Type value, for transmitting video or moving image data, possibly with audio as part of the composite video data format; "Content-Transfer-Encoding" header field, which can be used to specify an auxiliary encoding that was applied to the data in order to allow it to pass through mail transport mechanisms which may have data or character set limitations. Two additional header fields may be used to further describe the data in a message body: The "Content-ID" and "Content Description" header fields.

However, there are considerable drawbacks and deficiencies in transmitting video images and/or audio data over the Internet using E-mail's MIME. Firstly, there is often considerable time delays, such that it may take up to ten or more minutes to send a thirty-second video clip over the E-mail system. In times of high-traffic usage, the delay may even be more than ten minutes. Secondly, the video image or audio data cannot be viewed or listened to by the end-user, or recipient, until all of the data of the entire video or audio file has been received by the receiving computer, which, also, adds a considerable time lag to the actual viewing or listening. Thirdly, the end-user or recipient computer must have the necessary E-mail and MIME software for decoding the data. Fourthly, since MIME is an E-mail protocol system, the data is transmitted via the E-mail system, meaning that it is routed through one or more post offices and servers, which delay the transmission of the data, and which require that no other task be performed by the receiving computer if it is a single-tasking machine, like DOS-operating system machines. Fifthly, like all E-mail deliveries, the requisite E-mail software at the recipient computer must decode the encoded data received, and then cut-and-paste the data into a new file, such as NOTEPAD, which is time-consuming, before the new file is played back by a viewer or player.

In commonly-owned application Ser. No. 08/568,631, filed on Dec. 7, 1995, now abandoned there is disclosed a "catcher", which is a method and software code for catching a stream of data at a personal computer from the Internet for allowing substantially instant playback thereof by the personal computer, which "catcher" is utilized in the invention of the present application, as set forth hereinbelow.

SUMMARY OF THE INVENTION

It is the primary objective of the present invention to separate keys and data by providing a CD-ROM having its informational data of video and/or audio that is crippled, which data may only be read after it has been "uncrippled" by receiving "uncrippling" triggering data over the Internet from a server of a host system, so that a company's host computer serving the Internet may transmit the "uncrippling" data over the Internet to an end-user's receiving computer in order to uncripple and, thereby, actuate the CD-ROM, so that the data thereon may be read by the end-user's receiving computer only in volatile memory such as RAM.

It is another objective of the present invention to enable server control of the local media data by providing such a "crippled" CD-ROM with video and/or audio data thereon, whereby content by a company on the Internet may be better controlled, and whereby in conjunction with the content, video and/or audio playback may be combined with any updated, textual information, such as current price of a product or products, location of a store or stores in the vicinity of the end-user's residence, etc. Specific tracks on the CD-ROM can thereby be controlled by the remote server.

It is another objective of the present invention to provide such a "crippled" CD-ROM with video and/or audio data thereon, whereby the CD-ROM is inherently provided with Internet start-up and connecting program that automatically and directly connects the end-user's computer to the company's or content provider's host server via the Internet, whereby, not only does such facilitate and encourage the connection of the end-user to the content provider's web page, but also provides the content provider with valuable marketing information, such as the physical location of the caller, whereby selected information unique to that caller may be downloaded to him over the Internet, such as name and addresses of stores of the company or advertiser nearest to the caller, etc.

It is another objective of the present invention to provide such video imaging, with or without audio, such that the use of the E-mail system or the Internet system itself is entirely obviated.

It is another objective of the present invention to provide such video imaging, with or without audio, such that the data representing the video and/or audio is accessed off the end-user's CD-ROM, with the transmitted de-crippling triggering data from the content provider's host server (URL) being a trigger as small as a few bytes.

It is another objective of the present invention to allow by server permission only, the end-user the ability to store said trigger on non-volatile media for permanent ownership of said data.

Toward these and other ends, the method of the invention for transmitting the de-crippling triggering data for video and/or audio off a CD-ROM ("HyperCD") over the Internet consists of encoding the data representing critical information of the file keys such as the header of the video/audio files on the CD-ROM, and transmitting that encoded key to the local server of the local web of the Internet serving the caller, or end-user computer. The local server then establishes a point-to-point socket-connection between the transmitting, host computer, and the receiving or end-user computer, thereby obviating the need to send the actual video data over the Internet. When the encoded key is received by the receiving, or end-user, computer, the data is decoded and matched to the video/audio files of the CD-ROM, whereupon, since the data files on the CD-ROM now have an associated and complete header, the data thereof may be read, to thus allow the instant playback of the video-audio data on the CD-ROM.

Since the encoded header data that is sent over the Internet is a necessity before the end-user may playback the video/audio data from the CD-ROM, the host computer may send along with the encoded data, additional information pertinent to the information contained on the CD-ROM, such as current prices, special offers or deals, locations of local stores or dealers, or any information that the host computer, content provider, would like the end-user to receive.

In order to encourage the end-user to view the video/audio, the CD-ROM is provided with its own Internet dial-up program files for connecting to the host web server, so that very little time and effort is required on the part of the end-user.

BRIEF DESCRIPTION OF THE DRAWINGS

The invention will be more readily understood with reference to the accompanying drawings, wherein:

FIG. 5 is a block diagram showing the socket-to-socket connection for transmitting the de-crippling, triggering key for causing the display of the video images and/or audio data of a "HyperCD" at the end-user's PC over the Internet from a host computer combined with a targeted URL to a recipient or end-user's computer;

FIG. 6 is a block diagram showing the steps for forming on the CD-ROM the encoded video and audio data for use by the end-user recipient computer after having been crippled by removing the header-triggering key sent from the media files;

FIG. 7 is a block diagram showing the process of triggering in order to invoke "HyperCD" video and/or audio data at the receiving computer for playback; and FIG. 8 is a pictorial representation of the hardware component and software processing involved.

DETAILED DESCRIPTION OF THE INVENTION

Figure 1:
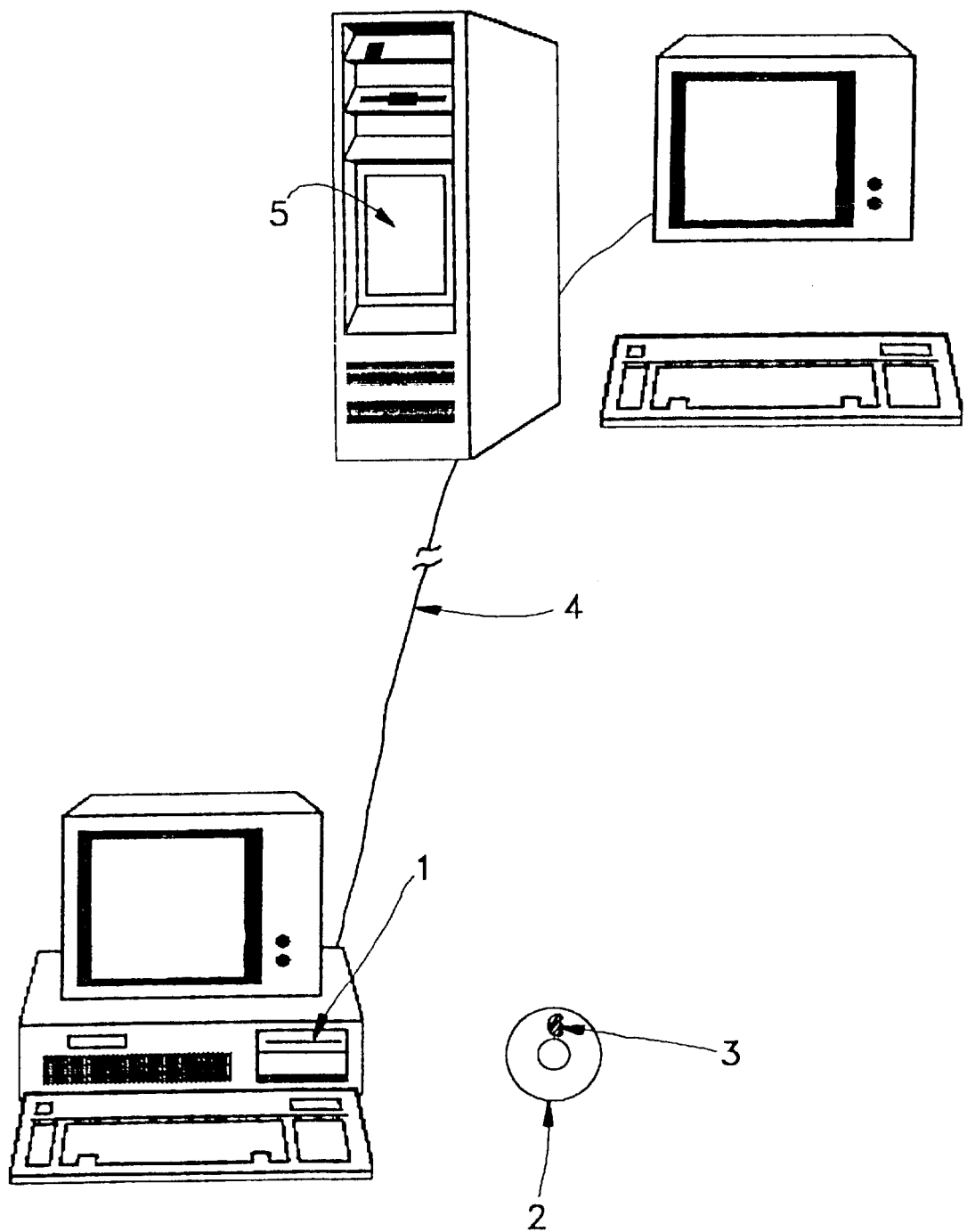
FIG. 1 is a pictorial representations of the hardware systems and software processes used for carrying out the present invention.
Figure 2:
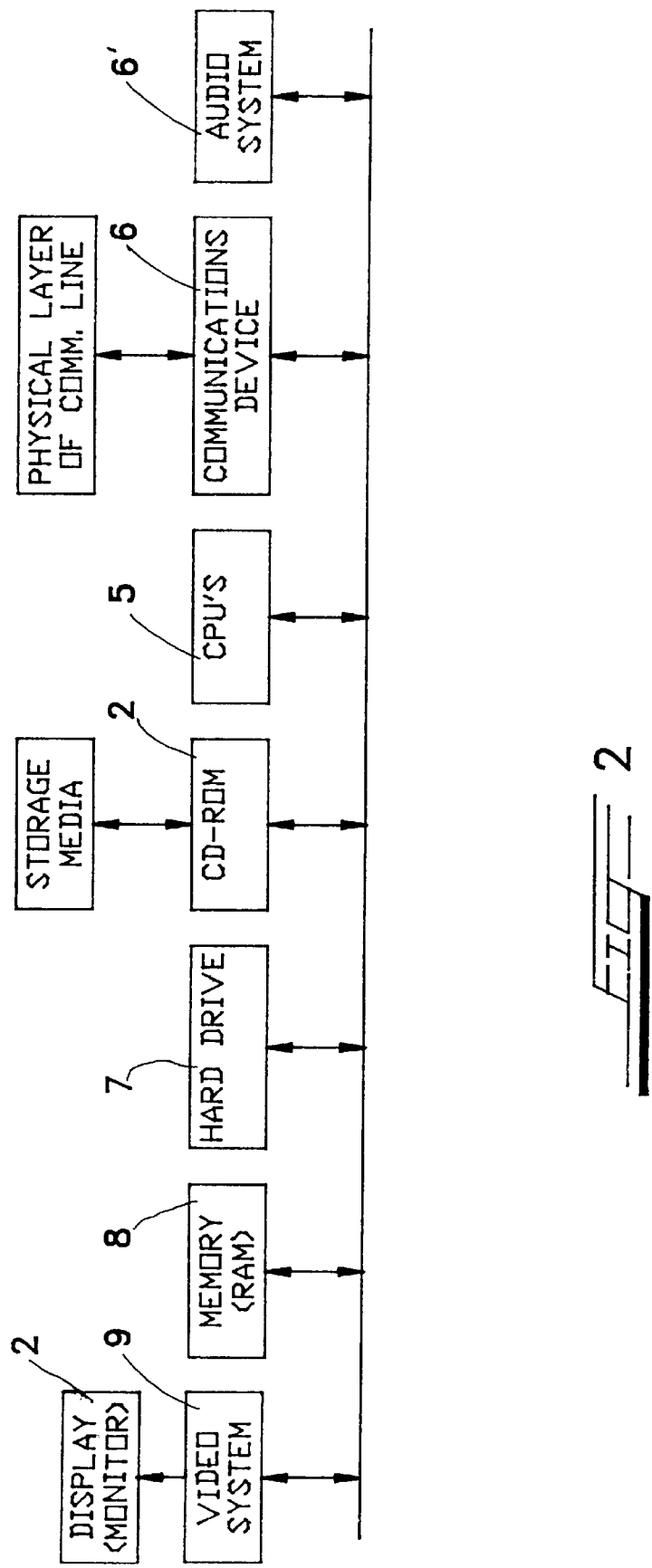
FIG. 2 is a block diagram showing the hardware of the end-user's computer used for carrying out the present invention.

Referring now to the drawings in greater detail, and to FIGS. 1 and 2 for now, the hardware used to carry out the present invention is shown. All of the hardware is conventional and well-known, and includes an end-user computer 1 having a CD-ROM drive 2 for playing a CD-ROM 3 having stored thereon crippled data 4 that is unreadable without first having received a trigger or uncrippling key 5. The end-user's computer 1 is connected via the Internet 6 to a host-computer server 7 which has stored thereat the uncrippling or triggering key 5 for the information stored on the end-user's CD-ROM 3. The end-user's computer 1 has a display and a CPU 9 and a communication-device, such as a modem 10 for establishing communication with the Internet 6. The computer 1 also has the CD-ROM drive 2, hard-drive 11, RAM 13, and video system 8 including monitor as well as audio system 13.

Figure 3:
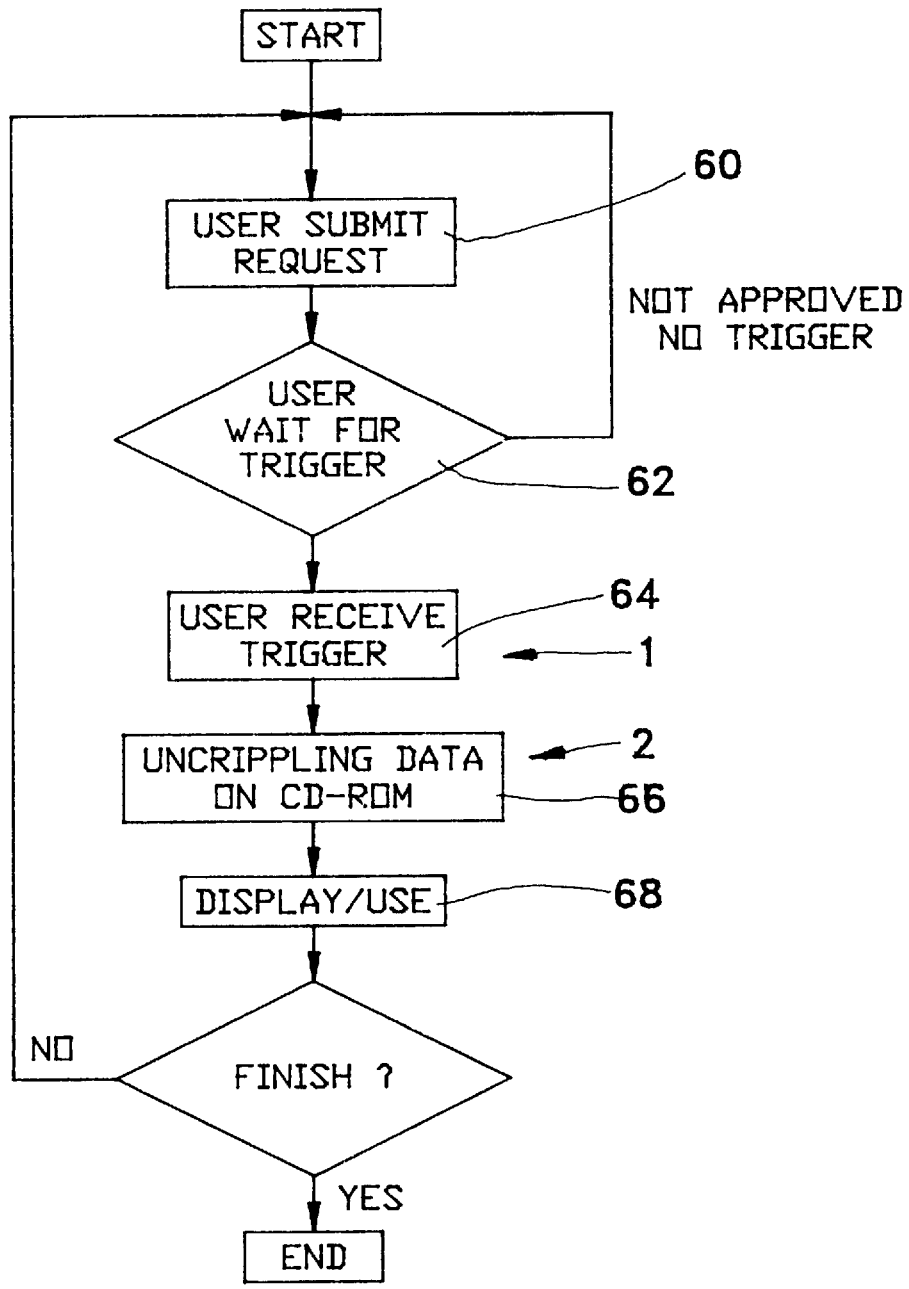
FIG. 3 is a flow chart at a user's computer for accessing the trigger-data from a web-site.

Referring to FIG. 3, there is shown the flow charts for receiving the uncrippling key. The end-user first submits a request over the Internet for the uncrippling key (block 60). The user then waits for that key (block 62), and if the user is not authorized, the request is denied. If the request is authorized, then the uncrippling key is sent by the server and received by the end-user's computer (block 64), whereupon the end-user's computer directs the uncrippling key into volatile memory such as RAM, not into a RAM-disk to be visible, but saved in a dynamically allocated data structure in RAM accessible only by the receiving program, combined with crippled data read from the CD-ROM and displays the video/animation (block 68).

Figure 4:
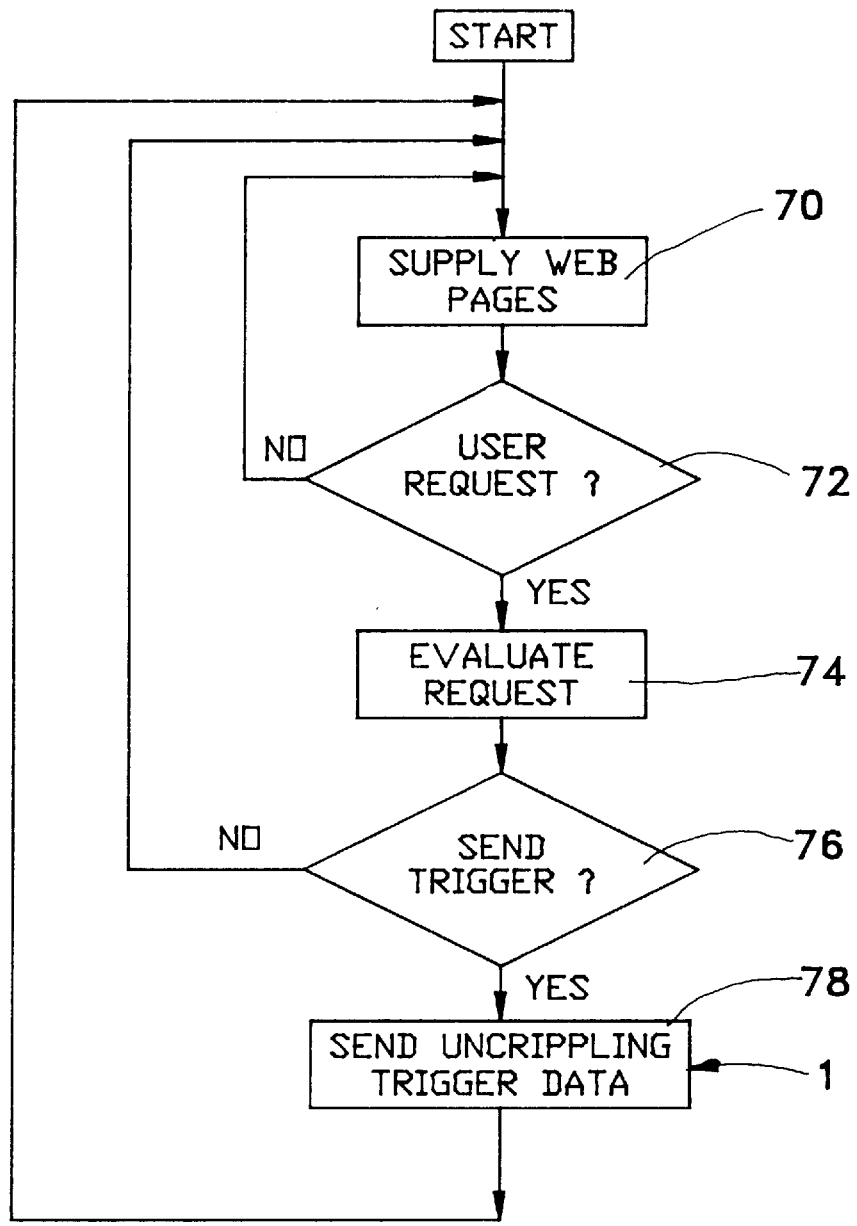
FIG. 4 is a flow chart for the server associated with the Internet for evaluating the trigger-request from the user's computer and for sending the trigger.

FIG. 4 shows the process-flow that at the server side. The server conventionally provides the web pages to the Internet users (block 70), and awaits a user-request (block 72). If a request is received from an end-user's computer, the server evaluates the request (block 74) in order to authorize the transfer of the uncrippling key (block 76). If an authorization is granted, then the uncrippling, trigger key is sent (block 78).

Referring now to FIGS. 5–7, video images and/or audio are converted from analogue to digital and stored in crippled fashion in digitized format (block 10) on CD-ROM 3. The crippling of the CD-ROM is achieved by removing critical information such as the video-audio header, whereupon such video/audio data is rendered unreadable by the end-user's computer. The "HyperCD" 3 is provided with the URL (web page) of the designated host computer, or server, (block 14), such, as for example: http://tekweb.com/hypercd/adver/lotto.html, which may be used on the CD-ROM for the Illinois Instant Lottery video advertising. Such digitized format may be existing computer memory files (block 12) that are already in binary format, or may be original files originated by recording the video and/or audio, as by a camcorder or tape, etc., and converting the analogue signals into digital, or binary, code. In the case of originating files, the analogue data may be converted to digital data using an INTEL "Smart Video Reorder Pro", for example. The raw binary data that is stored on the "HyperCD" (block 16) is crippled, so the only way to access the data is a socket-to-socket connection with the server of the web page of the host. By means of the process performed in block 14, the CD-ROM contains a code representing the URL web page of the host computer where the necessary de-crippling key is located. This data on the CD-ROM 3 will automatically call up and connect the end-user's computer to the host computer's server 7 on the Internet, whereby a socket-to-socket connection is made therebetween (block 18). Such an automatic connection is well-known, and will automatically find the end-user's browser, will call the Internet service provider, and pass the necessary links from the CD-ROM to the browser in order to get to the host's web page. Such software is available on the "Windows 95" operating system, such as "ActiveX". The host computer then sends back to the local server serving the end-user's computer the necessary, decrippling trigger for the specific video/audio data on the end-user's CD-ROM (block 20). From the local server, the data is sent out directly over the Internet to the end-user, and, in particular, to the RAM 12 of the end-user's computer (block 22). In RAM, the trigger (block 22), and the data on the CD-ROM 3 are combined, and played back (block 24), as described above. However, as will be explained hereinbelow, since the key 5 is being sent via Internet 6, the end-user's computer 7 must be equipped with the requisite software which is capable of receiving data from the server 7 and which will ensure that the received encoded key 5 is placed safely in RAM 12, and not allowed to be otherwise saved in hard drive 11 where it may be captured and used in a way not authorized by the server 7.

Referring to FIG. 6, at the end-user computer end, the raw analogue data of the audio/video is digitized (block 30), as explained above, and stored on CD-ROM 3 by conventional techniques. During the storage of the data on the key or critical information of the media file such as video-audio header associated with the video/audio files will be omitted from storage on the CD-ROM, whereupon the CD-ROM is crippled, or prevented from being read for playing back the video/audio files (block 32). The CD-ROM is provided with software for linking up the host-computer which has the necessary key 5 for uncrippling the video-audio files 4 on the CD-ROM 3, which linking software maps or automatically directs the end-user's computer to the host server via the Internet, such linking software having all of the necessary routing information for directing the Internet connection to the host computer's server and web page (URL) (Block 34). The encoding of the critical information such as "Header" trigger is achieved utilizing any conventional encoding program, such as, for example, RSA by Data Security (block 36). This encoding will create a trigger of a few bytes comprising all of the necessary information to trigger the CD-ROM, and to invoke the video and/or audio data.

FIG. 7 shows the steps involved for de-crippling the data on the CD-ROM 3 of a receiving or end-user's computer 1 (block 40). A socket-to-socket connection is made between the host, or sending, computer and the receiving, or end-user's computer by means of the linking software described above installed on the end-user's computer (block 42). The Internet Service Provider (ISP) of the end-user's computer's web of the Internet sends the data to the host computer's server over the Internet, which means that any number of local servers and gateways and routers will have been involved in transmitting the data, until it finally arrives at the server 7 serving the web associated with the host computer (block 42). As soon as this socket-to-socket connection is made, the encoded trigger 5 is sent, at a rate of about 3.6 Kbytes a second (block 44). The end-user's computer has a specially-dedicated software program for catching the key, decrypting the key 5 from the server and data from the CD-ROM 3, combining the key and data and playing it back. This catcher is a software program that will direct the incoming key to a random location in RAM 8 of the computer (block 46) and that the key will only be visible to the program. The catcher is necessary, since, if it were not present, it is the "nature" of personal computers to randomly dump data which has not had a specific destination assigned to it. Thus, without the catcher, the incoming data may be strewn into a different directory and/or sub-directories, to, thus, be irretrievably lost. As soon as the encoded key 5 arrives and is stored in RAM by means of the catcher program, a subroutine "player" in the program in the receiving computer begins to decode the trigger, in order to invoke the correct track of the CD-ROM (block 48), from which the data passes to the audio/video subsystem (8,13, FIG. 2), in order to play the video or audio (block 50). It is noted, and emphasized, that as soon as the key has been decoded, the video and/or audio data is immediately "played" back by the audio/video subsystems (8,13, FIG. 2), bypassing the necessity of having to first store the key, or other trigger, on a hard drive before playback.

Referring specifically to FIG. 8, there are shown the server 1, the user computer 2, and the software processes 3 used for transmitting the uncrippling key 4 over a network 5, the combining in RAM 6 of the key 4 and crippled data 7 from the CD-ROM 8, the rendering or displaying of the media data 9 such as video/audio or animation on the display 10 or from the audio system 11, and the storing of the key 4 to non-volatile media 13, such as a hard drive, for permanent ownership of the encrypted CD media.

It is noted that it is possible to "cripple" the video/audio data on the CD-ROM by other means other than deleting the header thereof. For example, the file could be made a hidden file, with the trigger data from the host computer being a command to remove the hidden status. Alternatively, the video/audio file could have a changed extension, with the trigger data from the host computer being a command to change the extension. Moreover, the crippling of the video/audio file may be achieved by the use of ZIP file, with the trigger data from the host computer being a command to UNZIP the data. It is, also, within the scope and purview of the invention to use a floppy disk for storing the crippled file, as described above, for those applications requiring less disk-memory, with the uncrippling data from the host server being sent to the floppy-disk drive via the catcher program, as described above for uncrippling the data on the floppy-disk. Of course, the crippled file may also be stored on any storage medium, such as the hard drive 11, with the uncrippling data from the host server being sent to the drive for that storage medium via the catcher program, as explained above. The uncrippling data may also be stored directly in a hard drive or EPROM so that the user has permanent access to it whenever he wishes to uncripple the file; that is, if the user wishes to permanently retain the crippled nature of the data on the CD-ROM, or floppy, he may permanently store the downloaded uncrippling data in hard drive in order to temporarily uncripple the data on the CD-ROM or floppy every time that it is used, as long as such access is authorized by the server.

The following is the software code listing for the server of the host computer's web for bursting the encoded "header" trigger data through the Internet.

```
.OJ OFF.PO1
                                SENDFILE.C
#!/usr/sbin/perl
# Get the input
read(STDIN, $buffer, $ENV{'CONTENT_LENGTH'});
# Split the name-value pairs
@pairs =split(/&/, $buffer);
foreach $pair (@pairs)
{
            ($name, $value) =split(/=/,$pair);
            # UN-Webify plus signs and %-encoding
            $value = -tr/+//;
            $value = -s/%([a-fA-FO-9][a-fA-FO-9]) /pack("C", hex($1)) /eg;
            $FORM{$name} =$value;
}
# Location of the CMC files
```

```
$CMCDIR =/'UL/people/CMC/' . $FORM{'dir'};
# If the $CMCDIR director is not found, exit
if( !-d "$CMCDIR" )
{
                &Error("$CMCDIR not found on this system. Please check the path and try agai
n\n");
}
# If there are no files in the CMC directory no point trying to transfer files
else
{
    opendir( THISDIR, "$CMCDIR" );
    @allfiles =grep(/\.CMC/, readdir(THISDIR));
    if( ! @allfiles ) {
                &Error("There are currently no CMC files in this directory. Try again later."); }
    sort @allfiles;
}
print ("HTTP/1.0 200\n");
print ("Content-type: multipart/x-mixed-replace;boundary=---ThisRandomString---\n\n");
print ("---ThisRandomString---\n");
#Send the First file with .IVD extension which invokes IVIDEO.EXE
print "Content-type: application/x-IVD\N\N";
$CONTENT ='cat $CMCDIR/CMC001.IVD';
print $CONTENT;
print ("\n---ThisRandomString---\n");
# Now send rest of the .CMC files which would call filehd1.exe
while (@allfiles)
{
                $file =shift @allfiles;
                print "Content-type: application/x-CMC\n\n";
                print "$file\n";
                $CONTENT ='cat $CMCDIR/$file';
                print $CONTENT;
                print ("\n---ThisRandomString---\n");
}
# Subroutine that tells whats wrong
sub Error
{
                print ("Content-type: texxt/html\n\n");
                print ("<Title>Error</Title>\n");
                print ("<H1>Error:</H1><p>\n");
                print (@_);
                print ("<p><p><hnref><=a\"mailto:cmcinter\@suba.com\">Contact webmaster </a>");
                exit 0;
}
```

The following is the software code listing at the host-computer for encoding the "header" binary data into seven-digit ASCII text format. and also listed is the software code listing for the "player", or decoder, at each receiving, or end-user, computer, for decoding the encoded text format back into binary:

```
            .LS1
HOOK_MENU1 MENU LOADONCALL MOVEABLE DISCHARDABLE
}
POPUP "&File"
{
    MENUITEM "&Encode . . . ", 1169
    MENUITEM "&Decode . . . ", 1170
}
POPUP "&Actions"
{
    MENUITEM "&Concatenate Files . . . ", 1171
    MENUITEM "&View A Report File . . . ", 1172
    MENUITEM "C&lean Directories . . . ", 1173
    MENUITEM SEPARATOR
    MENUITEM "&Display Wincode Task", 1174
    MENUITEM "&Hide Wincode Task", 1175
}
POPUP "&Options"
{
    MENUITEM "&Encode . . . ", 1176
    MENUITEM "&Decode . . . ", 1177
    MENUITEM "&Wincode . . . ", 1178
    MENUITEM "&Winsort . . . ", 1179
    MENUITEM SEPARATOR
    MENUITEM "&Viewer . . . ", 1180
    MENUITEM SEPARATOR
```

```
        MENUITEM "&ZIP/UNZIP . . . ", 1181
        MENUITEM SEPARATOR
        MENUITEM "&Hook App . . . ", 1182
    {
    POPUP "&Help"
    {
        MENUITEM "&Contents", 1183
        MENUITEM "&Search for Help on . . . ", 1184
        MENUITEM "&How to Use Help", 1185
        MENUITEM "&Wincode FAQ", 1186
        MENUITEM "C&opyrights", 1187
        MENUITEM SEPARATOR
        MENUITEM "O&rdering the Help file . . . ", 1188
        MENUITEM SEPARATOR
        MENUITEM "&About Wincode . . . ", 1189
    }
        MENUITEM SEPARATOR
        MENUITEM "&UnHook Wincode", 1190
        MENUITEM SEPARATOR
        MENUITEM "E&xit Wincode", 1191
    }
    HOOK_MENU2 MENU LOADONCALL MOVEABLE DISCARDABLE
    {
    POPUP "&File"
    {
        MENUITEM "&Encode . . . ", 2269
        MENUITEM "&Decode . . . ", 2270
    }
    POPUP "&Actions"
    {
        MENUITEM "&Concatenate Files . . . ", 2271
        MENUITEM "&View A Report File. . . ", 2272
        MENUITEM "C&lean Directories . . . ", 2273
        MENUITEM SEPARATOR
        MENUITEM "&Display Wincode Task", 2274
        MENUITEM "&Hide Wincode Task", 2275
    }
    POPUP "&Options"
    {
        MENUITEM "&Encode . . . ", 2276
        MENUITEM "&Decode . . . ", 2277
        MENUITEM "&Wincode . . . ", 2278
        MENUITEM "&Winsort . . . ", 2279
        MENUITEM SEPARATOR
        MENUITEM "&Viewer . . . ", 2280
        MENUITEM SEPARATOR
        MENUITEM "&ZIP/UNZIP . . . ", 2281
        MENUITEM SEPARATOR
        MENUITEM "&Hook App . . . ", 2282
    }
    POPUP "&Help"
    {
        MENUITEM "&Contents", 2283
        MENUITEM "&Search for Help on . . . ", 2284
        MENUITEM "&How to Use Help", 2285
        MENUITEM "&Wincode FAQ", 2286
        MENUITEM "C&opyrights", 2287
        MENUITEM SEPARATOR
        MENUITEM "O&rdering the Help file . . . ", 2288
        MENUITEM "&About Wincode . . . ", 2289
    }
        MENUITEM SEPARATOR
        MENUITEM "&UnHook Wincode", 2290
        MENUITEM SEPARATOR
        MENUITEM "E&xit Wincode", 2291
    }
        HOOK_MENU3 MENU LOADONCALL MOVEABLE DISCARDABLE
    (
    POPUP "&File"
    {
        MENUITEM "&Encode . . . ", 3369
        MENUITEM "&Decode . . . ", 3370
    }
    POPUP "&Actions"
    {
        MENUITEM "&Concatenate Files . . . ", 3371
        MENUITEM "&View A Report File . . . ", 3372
        MENUITEM "C&lean Directories . . . ", 3373
        MENUITEM SEPARATOR
        MENUITEM "&Display Wincode Task", 3374
```

-continued

```
        MENUITEM "Hide Wincode Task", 3375
}
POPUP "&Options"
{
        MENUITEM "&Encode . . . ", 3376
        MENUITEM "&Decode . . . ", 3377
        MENUITEM "&Wincode . . . ", 3378
        MENUITEM "&Winsort . . . ", 3379
        MENUITEM SEPARATOR
        MENUITEM "&Viewer . . . ", 3380
        MENUITEM SEPARATOR
        MENUITEM "&ZIP/UNZIP . . . ", 3381
        MENUITEM SEPARATOR
        MENUITEM "&Hook App . . . ", 3382
}
POPUP "&Help"
{
        MENUITEM "&Contents", 3383
        MENUITEM "&Search for Help on . . . ", 3384
        MENUITEM "&How to Use Help", 3385
        MENUITEM "&Wincode FAQ", 3386
        MENUITEM "C&opyrights", 3387
        MENUITEM SEPARATOR
        MENUITEM "O&rdering the Help file . . . ", 3388
        MENUITEM SEPARATOR
        MENUITEM "&About Wincode . . . ", 3389
}
        MENUITEM SEPARATOR
        MENUITEM "&UnHook Wincode", 3390
        MENUITEM SEPARATOR
        MENUITEM "E&xit Wincode", 3391
}
HOOK_WORKING DIALOG LOADONCALL MOVEABLE DISCARDABLE 100, 89, 141, 55
STYLE WS_POPUP |WS_VISIBLE |WS_CAPTION
CAPTION "Wincode Working . . . "
FONT 8, "MS Sans Serif"
{
        LTEXT "", 103, 81, 19, 27, 8
        LTEXT "", 102, 81, 9, 27, 8
        PUSHBUTTON "&Stop", 104, 18, 37, 45, 13
        PUSHBUTTON "&Quit", 105, 78, 37, 45, 13
        RTEXT "Total Job:", -1, 12, 19, 66, 8
        CONTROL "", -1, "STATIC", SS_BLACKFRAME |WS_CHILD |WS_VISIBLE, 6, 6, 129, 25
        RTEXT "", 101, 12, 9, 66, 8
}
BASE64_TYPE DIALOG LOADONCALL MOVEABLE DISCARDABLE 71, 26, 123, 181
STYLE DS_MODALFRAME |WS_POPUP |WS_CAPTION |WS_SYSMENU
FONT 8, "MS Sans Serif"
{
        DEFPUSHBUTTON "OK", 1, 12, 163, 45, 13
        RADIOBUTTON   "Application: &Octet-Stream:, 301, 12, 19, 99, 12, BS_AUTORADIOBUTTON  |WS_TABSTOP
        RADIOBUTTON   "Application: &Postscript:, 302, 12, 34, 99, 12, BS_AUTORADIOBUTTON  |WS_TABSTOP
        RADIOBUTTON   "Image: &JPEG", 303, 12, 49, 99, 12, BS_AUTORADIOBUTTON  |WS_TABSTOP
        RADIOBUTTON   "Image: &GIF", 304, 12, 64, 99, 12, BS_AUTORADIOBUTTON  |WS_TABSTOP
        RADIOBUTTON   "Image: &X-BMP", 305, 12, 79, 99, 12 BS-AUTORADIOBUTTON  |WS_TABSTOP
        RADIOBUTTON   "Video: &MPEG", 306, 12, 94, 99, 12, BS_AUTORADIOBUTTON  |WS_TABSTOP
        RADIOBUTTON   "Audio: X-&WAV", 307, 12, 109, 99, 12, BS_AUTORADIOBUTTON  |WS_TABSTOP
        PUSHBUTTON    "Cancel", 2, 66, 163, 45, 13
        GROUPBOX    "Content-Type", 101, 6, 5, 111, 152, BS-GROUPBOX  |WS_GROUP
}
DESC_TEXT DIALOG LOADONCALL MOVEABLE DISCARDABLE 9, 50, 288, 138
STYLE DS_MODALFRAME |WS_POPUP |WS_CAPTION |WS_SYSMENU'
CAPTION "Descriptive Text will be added to first Encoded file . . . "
FONT 8, "MS Sans Serif"
{
EDITTEXT 201, 6, 6, 276, 108, ES_MULTILINE |ES_AUTOVSCROLL |ES_WANTRETURN
        |WS_BORDER |WS_VSCROLL |WS_TABSTOP
DEFPUSHBUTTON "OK", 1, 69, 120, 60, 13
PUSHBUTTON "Cancel", 2, 159, 120, 60, 13
}
DIR_SELECT DIALOG LOADONCALL MOVEABLE DISCARDABLE 15, 20, 147, 116
STYLE DS_MODALFRAME |WS_OVERLAPPED |WS_CAPTION |WS_SYSMENU
FONT 8, "Helv"
{
EDITTEXT 101, 42, 5, 98, 12, ES_AUTOHSCROLL |WS_BORDER |WS_TABSTOP
DEFPUSHBUTTON "OK", 1, 88, 22, 50, 14
LISTBOX 103, 6, 30, 64, 82, LBS_STANDARD |WS_TABSTOP
PUSHBUTTON "Cancel", 2, 88, 41, 50, 14
LTEXT "D&irectories:", -1, 6, 18, 64 10
LTEXT "&Directory:" -1, 6, 6, 36, 10
```

```
}
EXISTS DIALOG LOADONCALL MOVEABLE DISCARDABLE 41, 34, 177, 54
STYLE DS_MODALFRAME  |WS_POPUP  |WS_CAPTION  |WS_SYSMENU
CAPTION "Wincode - Output File"
FONT 8, "MS Sans Serif"
{
    PUSHBUTTON "&Overwrite", 1, 9, 36, 45, 13
    PUSHBUTTON "&Rename", 101, 66, 36, 45, 13
    PUSHBUTTON "&Skip File", 2, 123, 36, 45, 13
    CTEXT "", 102, 21, 15, 135, 8
    CONTROL "", "STATIC", SS_BLACKFRAME  |WS_CHILD  |WS_VISIBLE, 15, 6, 147, 21
}
FILE OPEN DIALOG LOADONCALL MOVEABLE DISCARDABLE 40, 20, 202, 130
STYLE DS_MODALFRAME  |WS_OVERLAPPED  |WS_CAPTION  |WS_SYSMENU
FONT 8, "Helv"
{
    EDITEXT 100, 42, 6, 98, 12, ES_AUTOHSCROLL  |WS_BORDER  |WS_TABSTOP
    DEFPUSHBUTTON "OK", 1, 146, 5, 50, 14
    LISTBOX 102, 6, 44, 64, 82, LBS_STANDARD  |WS_TABSTOP
    LISTBOX 103, 76, 44, 64, 82, LBS_STANDARD  |WS_TABSTOP
    PUSHBUTTON "Cancel", 2, 146, 23, 50, 14
    LTEXT "File&name:", -1, 6, 8, 36, 10
    LTEXT "Directory:", -1, 6, 20, 36, 10
    LTEXT "", 101, 42, 20, 98, 10
    LTEXT "&Files:", -1, 6, 32, 64, 10
    LTEXT "&Directories:", -1, 76, 32, 64, 10
}
RENAME DIALOG LOADONCALL MOVEABLE DISCARDABLE 34, 31, 199, 57
STYLE DS_MODALFRAME  |WS_POPUP  |WS_CAPTION  |WS_SYSMENU
FONT 8, "MS Sans Serif"
{
    EDITEXT 102, 6, 21, 171, 12 ES_AUTOHSCROLL  |WS_BORDER  |WS_TABSTOP
    PUSHBUTTON "?", 103, 180, 20, 12, 13
    DEFPUSHBUTTON "OK", 1, 42, 39, 45, 13
    PUSHBUTTON "Cancel", 2, 111, 39, 45, 13
    LTEXT "Enter a VALID DOS filename:", 104, 6, 6, 159, 9
}
VIEW_RPT DIALOG LOADONCALL MOVEABLE DISCARDABLE 20, 43, 300, 154
STYLE DS-MODALFRAME  |WS_POPUP  |WS_CAPTION  |WS_SYSMENU
CAPTION "Wincode - Report File Viewer"
FONT 8, "MS Sans Serif"
{
DEFPUSHBUTTON "OK", 2, 111, 135, 78, 13
EDITTEXT 101, 6, 15, 288, 99 ES_MULTILINE  |ES_READONLY  |WS_BORDER  |WS_VSCROLL  |WS_HSCROLL  |WS_TABSTOP
CHECKBOX "&Delete Report File After Viewing", 103, 6, 117, 138, 12, BS-AUTOCHECKBOX  |WS_TABSTOP
    LTEXT "File:", -1, 7, 5, 15, 8
    LTEXT "", 102, 25, 5, 270, 8
}
```

The following is the software code listing at each receiving, or end-user, computer, for the catcher for receiving the uncrippling data in the cache directory of RAM and for immediately playing the CD-ROM.

```
/*----------------------------------------------------------------
        File:      npshell Advanced Features:
                * HyperCD HTML cOmmnad (H2O) set
                * stream capture
                * encryption/decryption
                * file handling Netscape
        Programmer: Plugin Empty Shell,             96 J.F.
                    HyperCD HTML cOmmnad(H2O) set,  96 J.F.
                    Dict./File handling,            96 J.F.
                    Encryption/Decryption, /*----------------------------------------------------------------
//
// This file defines a "shell" plugin that can be used as the
// basis for a real plugin. This shell just provides empty
// implementations of all functions that the plugin can implement
// that will be called by Netscape (the NPP_xxx methods defined in
// npapi.h).
//
//---------------------------------------------------------------*/
/*---------------------------------------------------------------- ifndef _NPAPI_H_
include "npapi.h"
#include "plgwnd.h"
#include "CHyperCD.h"
endif // mmio
include <mmsystem.h>

// headers for read/system call include <string.h>
include <io.h>
#include <fcntl.h>
#include <sys/stat.h>
#include "xsystem.h"

#define DEBUG_HEADER 0
#define DEBUG_PROC 0
#define DEBUG_USE_MEMCPY 0
#define DEBUG_TEST(s) if(DEBUG_PROC)MessageBox(NULL,s,"DEBUG_PROC",MB_OK);
//----------------------------------------------------------------
// SysFileControl:
//----------------------------------------------------------------
void SysFileControl(char *mm,int nLength, char *control)
{
int l,X;
char cc,tt[MAX_STR];

l= strlen(control);
for( X = 0;X< nLength;X++)
    {
    cc =  control[ X%l ];
    if(X_DEBUG )
        {
        wsprintf(tt,"mm=[%s]Length=[%d]cc=[%c] mm[%c]=>mm[%c]",mm,nLength,cc,mm[X],mm[X]^cc);
        MessageBox(NULL,tt,"",MB_OK);
        }
    mm[X] = mm[X]^cc;
    }
if(X_DEBUG )
    MessageBox(NULL,mm,"File after loop",MB_OK);
}

//----------------------------------------------------------------
// SysIO:
```

```
//-----------------------------------------------------------------
void SysIO(char *szSYSFILE)
{
char    szFileContent[MAXDIRCHAR];
char    szMsg[MAX_STR*4];
int     hFile, nRead, nFileLength;
int     nLoc=0,i,ret;
char    *pTemp;

if( (hFile = _open(szSYSFILE, _O_RDONLY|_O_BINARY, _S_IREAD )) != -1 )
    {
    nFileLength=(int)_filelength( hFile );
    if(XDB_DEBUG )
        {
        wsprintf(szMsg, "File length before: %d\n", nFileLength );
        MessageBox(NULL,szMsg,NULL,MB_OK);
        }
    nRead = _read(hFile, szFileContent, (unsigned int )nFileLength );
    _close( hFile );

if(XDB_DEBUG )
        {
        wsprintf(szMsg, "File length after: %d\n", nRead );
        MessageBox(NULL,szMsg,"",MB_OK);
        }
    szFileContent[nFileLength-2] ='\0';
    nFileLength -= 2;

if(XDB_DEBUG)
        MessageBox(NULL,szFileContent,"Whole file",MB_OK);
    SysFileControl(szFileContent,nFileLength, DEFAULT);
    if(XDB_DEBUG )
        MessageBox(NULL,szFileContent,"Whole file after decode",MB_OK);
    pTemp=szFileContent;

for(i=nDirItem=0;i<MAXDIRITEM;i++)
        {
        ret=sscanf(pTemp,"%s",szMsg);
        if(ret ==0)
            continue;
        else if(ret == EOF)
            break;

//not newline char
        if((strcmp(szMsg,"\n") != 0) && (strlen(szMsg)>0))
            {
            strcpy(Dir[nDirItem],szMsg);
            nDirItem++;
            }
        nLoc=strcspn(pTemp, "\n" );
        pTemp = pTemp+nLoc+1;
        if(pTemp > szFileContent+nFileLength)
            break;
        }
    if(XDB_DEBUG )
        {
        wsprintf(szMsg, "Names Read %d\n", nDirItem);
        MessageBox(NULL,szMsg,"",MB_OK);

strcpy(szMsg,"------------------");
        for(i=0;i<nDirItem;i++)
            {
            strcat(szMsg,Dir[i]);
            strcat(szMsg,"\n");
            }
        strcat(szMsg,"------------------");
        MessageBox(NULL,szMsg,"File Content",MB_OK);
        }
    }
else
    {
    MessageBox(NULL,MISSDBFILE,"Error",MB_OK);
    return;
```

```
        }
}

//-----------------------------------------------------------------------
// NPP_Initialize:
//-----------------------------------------------------------------------
NPError NPP_Initialize(void)
{
    DEBUG_TEST("NPP_Initialize")
    //SysIO();

return NPERR_NO_ERROR;
}

//-----------------------------------------------------------------------
// NPP_Shutdown:
//-----------------------------------------------------------------------
void NPP_Shutdown(void)
{
    DEBUG_TEST("NPP_Shutdown")
    return;
}

//-----------------------------------------------------------------------
// NPP_New:
//-----------------------------------------------------------------------
NPError NP_LOADDS
NPP_New(NPMIMEType pluginType,
        NPP instance,
        uint16 mode,
        int16 argc,
        char* argn[],
        char* argv[],
        NPSavedData* saved)
{
    DEBUG_TEST("NPP_New")

if (instance == NULL)
        return NPERR_INVALID_INSTANCE_ERROR;

instance->pdata = NPN_MemAlloc(sizeof(PluginInstance));
    PluginInstance* This = (PluginInstance*) instance->pdata;
    if (This != NULL)
    {
        This->window = NULL;
        This->cHypercd = new CHyperCD();
        This->mode = mode;

This->bAutoStart = FALSE;
        This->bLoop = FALSE;

int idx;char msg[MAX_STR], sSYSFILE[MAX_STR];
        strcpy(msg,"");
        strcpy(sSYSFILE,SYSFILE);
        char *p1,*p2, cd_title[MAX_STR];

for ( idx =0; idx<argc; idx++) {
            if(strcmp(strupr(argn[idx]),"SRC")==0)
            {
                //MessageBox(NULL,argv[idx],"argv ",MB_OK);
                p2=strstr(strupr(argv[idx]),".Q");
                if(p2==NULL)
                {
                    MessageBox(NULL,argv[idx],"Missing .q in file name",MB_OK);
                    return 0;
                } while((*p2 != '_' )&&(p2> argv[idx]))
                    p2--;
```

```
                if(*p2 == '_')
                {
                    p1=--p2;

while((*p1 != '\\' || *p1 != '/')&&(p1> argv[idx]))
                        p1--;

for(int i=0;i<=(int)(p2-p1);i++)
                        cd_title[i]=*(p1+i);
                    cd_title[i]='\000';
                //  wsprintf(msg,"Info argv[%s]p1[%c]p2[%c](p2-p1)[%d]cd[%s]",argv[idx],*p1,*p2,(int
)(p2-p1),cd_title);
                //  MessageBox(NULL,msg,"p1 p2 stuff",MB_OK);
                    strcpy(sSYSFILE,"\\hypercd\\");
                    strcat(sSYSFILE,cd_title);
                    strcat(sSYSFILE,".xdb");
                    break;
                }
                //or else missing '_', assuming xhc file
            }
        }
//      MessageBox(NULL,sSYSFILE,"Xdb filename",MB_OK);
        SysIO(sSYSFILE);

for (idx =0; idx<argc; idx++) {
            if (!strcmpi(argn[idx],"autostart")) {
                if (!strcmpi(argv[idx],"true")) {
                    This->bAutoStart = TRUE;
                }
            } if (!strcmpi(argn[idx],"loop")) {
                if (!strcmpi(argv[idx],"true")) {
                    This->bLoop = TRUE;
                }
            }

/*  Featres to be implemented
            HyperCD HTML cOmmnad (H2O) set:
            botton=true/false
            desolve/etc if (!strcmpi(argn[idx],"button")) {
                if (!strcmpi(argv[idx],"true")) {
                    This->bShowBotton = TRUE;
                }
            }
        */
        }
        instance->pdata = This;   // save my data pointer in the instance pdata pointer
                                  // this will be passed back to me in all calls so that I
                                  // can extract it later
        return NPERR_NO_ERROR;
    }
    else
        return NPERR_OUT_OF_MEMORY_ERROR;
} static void UnSubclass(PluginInstance *This)
{
    WNDPROC     OldWndProc;
    WNDPROC*    lplpfn = This->window->GetSuperWndProcAddr();

DEBUG_TEST("UnSubclass")

if ( !*lplpfn )
    {
        ASSERT(0);
        return;
    }
```

26

```
                    window$ procedure
    // Set the original wind    procedure
    OldWndProc = (WNDPROC);           ( This->window->m_hWnd,
                           SetWindowLong GWL_WNDPROC, (LONG) *_lpfn );

// A subclassed window's procedure is always AfxWndProc.
    // If this is not TRUE, then it's not a subclassed window.
    if ( OldWndProc != AfxWndProc )
        ASSERT(0);
} static void KillHyperCDWindow(PluginInstance *This)
{

DEBUG_TEST("KillHyperCDWindow")

if (This->cHypercd) {
        This->cHypercd->Close();
        delete This->cHypercd;
        This->cHypercd = NULL;
    } mmioInstallIOProc(mmioFOURCC('P', 'G', 'Z', ' '), NULL, MMIO_REMOVEPROC);

UnSubclass(This);

if (This->window) {
        This->window->Detach();
        delete This->window;
        This->window = NULL;
    }
}

//-----------------------------------------------------------------------------
// NPP_Destroy:
//-----------------------------------------------------------------------------
NPError NP_LOADDS
NPP_Destroy(NPP instance, NPSavedData** save)
{ if (instance == NULL)
        return NPERR_INVALID_INSTANCE_ERROR;

PluginInstance* This = (PluginInstance*) instance->pdata;

//
    // Note: If desired, call NP_MemAlloc to create a
    // NPSavedData structure containing any state information
    // that you want restored if this plugin instance is later
    // recreated.
    // if (This != NULL)
    {
        KillHyperCDWindow(This);
        NPN_MemFree(instance->pdata);
    } return NPERR_NO_ERROR;
}

//-----------------------------------------------------------------------------
// NPP_SetWindow:
//-----------------------------------------------------------------------------
NPError NP_LOADDS
NPP_SetWindow(NPP instance, NPWindow* np_window)
{
```

```
        DEBUG_TEST("NPP_SetWindow")

if (instance == NULL)
        return NPERR_INVALID_INSTANCE_ERROR;

PluginInstance* This = (PluginInstance*) instance->pdata;

//
    // Note: Before setting fWindow to point to the
    // new window, you may wish to compare the new window
    // info to the previous window (if any) to note window
    // size changes, etc.
    // if (!np_window)
        return NPERR_GENERIC_ERROR;

if (!instance)
        return  NPERR_INVALID_INSTANCE_ERROR;

if (!This)
        return NPERR_GENERIC_ERROR;

if (!np_window->window && !This->window) // spurious entry
        return NPERR_NO_ERROR;

if (!np_window->window && This->window)
    {   // window went away
        KillHyperCDWindow(This);
        return NPERR_NO_ERROR;
    }
    if (!This->window && np_window->window)
    {   // First time in -- no window created by plugin yet
        This->window = (CPluginWindow *) new CPluginWindow();
        if (!This->window->SubclassWindow((HWND)np_window->window))
        {
            MessageBox(NULL,"SubclassWindow Failed","HyperCD",MB_OK);
            return NPERR_GENERIC_ERROR;
        }
        // Save This pointer in window class member variable..this lets the
        // window message handling have access to the data pointer easily
        This->window->StoreData(This);
    }

// resize or moved window (or newly created)
    This->window->InvalidateRect(NULL);
    This->window->UpdateWindow();
    return NPERR_NO_ERROR;
}

//--------------------------------------------------------------------------------
// NPP_NewStream:
//--------------------------------------------------------------------------------
NPError NP_LOADDS
NPP_NewStream(NPP instance,
                            NPMIMEType type,
                            NPStream *stream,
                            NPBool seekable,
                            uint16 *stype)
{

DEBUG_TEST("NPP_NewStream")

if (instance == NULL)
        return NPERR_INVALID_INSTANCE_ERROR;
    PluginInstance* This = (PluginInstance*) instance->pdata;
```

```
    *stype = NP_ASFILE;

return NPERR_NO_ERROR;
} int32 STREAMBUFSIZE = 0X0FFFFFFF;    // If we are reading from a file in NPAsFile
                                     // mode so we can take any size stream in our
                                     // write call (since we ignore it)
//----------------------------------------------------------------------------
// NPP_WriteReady:
//----------------------------------------------------------------------------
int32 NP_LOADDS
NPP_WriteReady(NPP instance, NPStream *stream)
{
    DEBUG_TEST("NPP_WriteReady")

if (instance != NULL)
    {
        PluginInstance* This = (PluginInstance*) instance->pdata;
    }
    return STREAMBUFSIZE;    // Number of bytes ready to accept in NPP_Write()
}

//----------------------------------------------------------------------------
// NPP_Write:
//----------------------------------------------------------------------------
int32 NP_LOADDS
NPP_Write(NPP instance, NPStream *stream, int32 offset, int32 len, void *buffer)
{
    DEBUG_TEST("NPP_Write")

if (instance != NULL)
    {
        PluginInstance* This = (PluginInstance*) instance->pdata;

} return len;         // The number of bytes accepted
}
//----------------------------------------------------------------------------
// NPP_DestroyStream:
//----------------------------------------------------------------------------
NPError NP_LOADDS
NPP_DestroyStream(NPP instance, NPStream *stream, NPError reason)
{
    DEBUG_TEST("NPP_DestroyStream")

if (instance == NULL)
        return NPERR_INVALID_INSTANCE_ERROR;
    PluginInstance* This = (PluginInstance*) instance->pdata;

return NPERR_NO_ERROR;
} typedef struct TH {unsigned char T,V,L;} THeader;
typedef THeader *PTHeader;
void GetFileType(char *szFile,PTHeader pHeader )
{       static long fileSize;

static HMMIO hmmio;
    char header[300];
    int L,V,T;

hmmio = mmioOpen(szFile, NULL, MMIO_READ);
```

```
        // Determine the size of the file
    MMIOINFO mmioInfo;
    mmioSeek(hmmio, 0, SEEK_END);
    mmioGetInfo(hmmio, &mmioInfo, 0);
    fileSize = mmioInfo.lDiskOffset;

//Set to the beginning of the file
    mmioSeek(hmmio, 0, SEEK_SET);

// decipher JF
    mmioRead(hmmio, (HPSTR) header, 20);
    mmioClose(hmmio, 0);

pHeader->V=0;
    pHeader->T=0;
    pHeader->L=0;

if( strncmp( header, "PGZ " , 4 ) == 0)
        {
        V= (unsigned char) header[8];
        T= (unsigned char) header[12];
        L= (unsigned char) header[16];
        #if(DEBUG_HEADER==1)
        wsprintf(s,"Info V[%d]T[%d]L[%d]",V,T,L);
        MessageBox(NULL,s,"read file type back",MB_OK);
        #endif
        pHeader->V=V;
        pHeader->T=T;
        pHeader->L=L;
        }
}
//--------------------------------------------------------------------------------
// IOProc:
//--------------------------------------------------------------------------------

LRESULT CALLBACK IOProc(LPMMIOINFO lpMMIOInfo, UINT uMessage, LPARAM lParam1, LPARAM lParam2)
{
    static BOOL alreadyOpened = FALSE;
    static long fileSize;
    int ret;
    char s[250]; // for debugging info switch (uMessage) {
        case MMIOM_OPEN:
            //wsprintf(s, "MMIOM_OPEN: with flags 0x%1X\n\r", lpMMIOInfo->dwFlags);
            //OutputDebugString(s);
            if (alreadyOpened)
                return 0;
            alreadyOpened = TRUE;

//#define MYFILENAME "c:\\windows\\desktop\\jay-mmio\\test.pgz"
//#define MYFILENAME "e:\\sample.mov"
//#ifndef MYFILENAME
//        char MYFILENAME[300];
//#endif if 0 // use mmio to open and load
        // Now read the file into memory.  This part can be placed outside this proc so
        // that the file is already placed in memory
        static HMMIO hmmio;
        hmmio = mmioOpen(MYFILENAME, NULL, MMIO_READ);

// Determine the size of the file
        MMIOINFO mmioInfo;
        mmioSeek(hmmio, 0, SEEK_END);
        mmioGetInfo(hmmio, &mmioInfo, 0);
        fileSize = mmioInfo.lDiskOffset;

//Set to the beginning of the file
        mmioSeek(hmmio, 0, SEEK_SET);
```

30

```
        // decipher JF            [300]           (HPSTR)
        char header[300],msg        [;int L;
        mmioRead(hmmio, HPS     header, 20);
        MessageBox(NULL, header, "HEADER", MB_ICONINFORMATION | M_OK);
        if( strncmp( header, "PGZ " , 4 ) == 0)
        {
            // add buffer
            L= (unsigned char) header[16];
            wsprintf(msg,"The char is [%c]. The value is [%d]",header[8],L);
            MessageBox(NULL,msg,"read back length",MB_OK);
            mmioSeek(hmmio, L, SEEK_CUR);
        }
    else
            mmioSeek(hmmio, 0, SEEK_SET);

// Get the content!
        static HANDLE hData;
        static char * lpData;

if(DEBUG_USE_MEMCPY)
        {
            hData = GlobalAlloc(GMEM_MOVEABLE , fileSize );
            lpData = (char *)GlobalLock(hData);
            mmioRead(hmmio, (HPSTR) lpData, fileSize);
            mmioClose(hmmio, 0);
        } else // use C-runtime

// Determine the size of the file
        struct _stat buf;
        int result;

// Get data size associated with the file
        result = _stat(MYFILENAME, &buf );
        fileSize = buf.st_size;

// Get the content!
        static HANDLE hData;
        static char * lpData;
        DWORD nBytesRead;
        if(DEBUG_USE_MEMCPY)
        {
            hData = GlobalAlloc(GMEM_MOVEABLE , fileSize );
            lpData = (char *)GlobalLock(hData);
        } static FILE *pF;
        if((pF= fopen(MYFILENAME, "r+b")) == NULL)
        {
            MessageBox(NULL, MYFILENAME, "File Open Failure", MB_OK);
            return -1;
        }

// decipher JF
        char header[300],msg[200];
        static int L;
        fread((void *) header, 1, 20, pF);
        if( strncmp( header, "PGZ " , 4 ) == 0)
        {
            L= (unsigned char) header[16];

#if(DEBUG_HEADER==1)
            wsprintf(msg,"The char is [%c]. The value is [%d]",header[8],L);
            MessageBox(NULL,msg,"read back length",MB_OK);
            #endif fseek(pF, (long) L, SEEK_CUR);
        }
    else
            fseek(pF, 0L, SEEK_SET);

if(DEBUG_USE_MEMCPY)
```

31

```
            {
            nBytesRead=fread(        lpData, 1, fileSize, pF);
            fclose(pF);
            }
endif
        lpMMIOInfo->lDiskOffset = 0;
        return 0;

case MMIOM_CLOSE:
        OutputDebugString("MMIOM_CLOSE:\n\r");

if(DEBUG_USE_MEMCPY)
            {
            GlobalUnlock(lpData);
            GlobalFree(hData);
            }
        else
            fclose(pF);

alreadyOpened = FALSE;
        return 0;

case MMIOM_READ:
        wsprintf(s, "MMIOM_READ: Read %lu (0x%1X) byte(s) \n\r", lParam2, lParam2);
        OutputDebugString(s);

if(DEBUG_USE_MEMCPY)
            memcpy((void *)lParam1, lpData+lpMMIOInfo->lDiskOffset, lParam2);
        else
            fread((void *) lParam1, 1, lParam2, pF);

lpMMIOInfo->lDiskOffset += lParam2;
        return (lParam2);

case MMIOM_SEEK:
        OutputDebugString("MMIOM_SEEK\n\r");
        switch (lParam2) {
            case SEEK_SET:
                wsprintf(s, "SEEK_SET: Set to %lu (0x%1X) byte(s)\r\n", lParam1, lParam1);
                OutputDebugString(s);
                lpMMIOInfo->lDiskOffset = lParam1;   //   lpMMIOInfo->lDiskOffset has relative addr without header if(DEBUG_USE_MEMCPY==0)
                    ret = fseek(pF, lParam1+L+20, SEEK_SET);
                break;

case SEEK_CUR:
                wsprintf(s, "SEEK_CUR: Set to %lu (0x%1X)byte(s)\r\n", lParam1, lParam1);
                OutputDebugString(s);
                fseek(pF, lParam1, SEEK_CUR);
                lpMMIOInfo->lDiskOffset += lParam1;

case SEEK_END:
                wsprintf(s, "SEEK_END: Set to %lu byte(s) from the end\r\n", lParam1);
                OutputDebugString(s);
                lpMMIOInfo->lDiskOffset = fileSize - 1 - lParam1;

if(DEBUG_USE_MEMCPY==0)
                    ret = fseek(pF, lParam1, SEEK_END);

break;
            }
            return lpMMIOInfo->lDiskOffset;

default:
            return -1;   // Unexpected msgs. For instance, we do not
                         // process MMIOM_WRITE in this sample
        }
}// end of IOProc
```

```
//-----------------------------------------------
// NPP_StreamAsFile:
//-----------------------------------------------
void NP_LOADDS
NPP_StreamAsFile(NPP instance, NPStream *stream, const char* fname)
{
    int     nTrigger, nType;
    char    szFile[MAX_STR],szMessage[MAX_STR];
    FILE    *pfFileName;
    DEBUG_TEST("NPP_StreamAsFile")

// handle exception
    if (instance == NULL)
        return;

PluginInstance* This = (PluginInstance*) instance->pdata;
    if (This->cHypercd)
    {
        //
        if(DEBUG )
            MessageBox(NULL,fname,"",MB_OK);

if((pfFileName=fopen(fname,"r")) == NULL)
        {
            MessageBox(NULL,"Error in stream file","",MB_OK);
            return;
        }
        fscanf(pfFileName,"%d",&nTrigger);
        fclose(pfFileName);

if(DEBUG )
        {
            wsprintf(szMessage,"iCode=%10d",nTrigger);
            MessageBox(NULL,szMessage,"DEBUG",MB_OK);
        }
        if(nTrigger > nDirItem || nTrigger <0)
        {
            wsprintf(szMessage,"Invalid code (%d:%d).",nTrigger,nDirItem);
            MessageBox(NULL,szMessage,"Error",MB_OK);
            return;
        }

// determine the path to the data file
        char *pTemp, szPath[MAX_STR];
        STRING szIniStr;
        FILE *pfINIFile;
        strcpy(szPath,DEFAULT_CDROM_DRIVE);
        if((pfINIFile=fopen(INI_FILE,"r")) != NULL)
        {
            fscanf(pfINIFile,"%s",szIniStr);
            strcpy(szIniStr,strupr(szIniStr));
            if(INI_DEBUG)
                MessageBox(NULL,szIniStr,"int str",MB_OK);
            pTemp=strstr(szIniStr,"CDROM");
            if(pTemp != NULL)
            {
                if(INI_DEBUG)
                    MessageBox(NULL,pTemp,"cdrom?",MB_OK);

pTemp=strstr(pTemp,"="); pTemp++;
                while(*pTemp==' ')
                    pTemp++;

if(INI_DEBUG)
                    MessageBox(NULL,pTemp,"=?",MB_OK);
                if(strlen(pTemp)>0)
                {
                    strcpy(szPath,pTemp);
                    strcat(szPath,":\\");
                }
                if(INI_DEBUG)
```

```
                    (NULL
               MessageBox(NULL,szPath,"path",MB_OK);
        }
    // now we have the   at the path
    if(INI_DEBUG)
        MessageBox(NULL,szPath,"Data Path",MB_OK);
    fclose(pfINIFile);
    }
else if(INI_DEBUG)
    MessageBox(NULL,szPath,"Ini file not found",MB_OK);

// path+file
strcpy(szFile,szPath);
strcat(szFile,Dir[nTrigger-1]);

// determine the type of data file
strcpy(szFile, _strupr(szFile));
if(PATH_DEBUG)
    MessageBox(NULL,szFile,"szFile",MB_OK);

if(strstr(szFile, ".PGZ") != NULL)
    nType = HCD_PGZ ;
else if(strstr(szFile, ".AVI") != NULL)
    nType = HCD_AVI ;
else if(strstr(szFile, ".EXE")!= NULL)
    nType = HCD_EXE ;
else if(strstr(szFile, ".PGX")!= NULL)
    nType = HCD_EXE ;
else if(strstr(szFile, ".MOV")!= NULL)
    nType = HCD_MOV ;
else if(strstr(szFile, ".PGM")!= NULL)
    nType = HCD_MOV ;
else if(strstr(szFile, ".MPG")!= NULL)
    nType = HCD_MPG ;
else
    nType = HCD_ANY ;

#if(INI_DEBUG)
    {
    wsprintf(szMessage,"File=[%s] Type=[%d]",szFile,nType);
    MessageBox(NULL,szMessage,"DEBUG",MB_OK);
    }
endif // take action
if(nType == HCD_EXE)
    {
    if(INI_DEBUG )
        MessageBox(NULL,szFile,"Executing ...",MB_OK);
    WinExec(szFile,SW_SHOWNORMAL);
    return;
    }

// x type
else if(nType == HCD_PGZ)
    {
    //unlock kgm
    mmioInstallIOProc(mmioFOURCC('P', 'G', 'Z', ' '), (LPMMIOPROC)IOProc,
    MMIO_INSTALLPROC | MMIO_GLOBALPROC);
    //DWORD dwReturn;
    //activate IOProc
    strcpy(MYFILENAME, szFile);   //now MMIOM_OPEN takes szFile as lParam1
    // now make sure it's an AVI, then set the type
    //This->cHypercd->Open(This->window,"hypercd.kgm+","AVIVideo");

char szMsg[200];
    strcpy(szMsg,szFile);strcat(szMsg, "+");
    THeader HDR;
    GetFileType(szFile,&HDR);

if(HDR.T==1)
        This->cHypercd->Open(This->window,szMsg,"AVIVideo");
    else if(HDR.T==3)
```

```
                This->cHypercd->Open(This->window,szMsg,"QTWVideo");   //QTWVideo
                        SendString
        //dwReturn = mciS  String("open hypercd.kgm+ type av    e", NULL, NULL, NULL);
        //char mciErr[255];
        //mciGetErrorString(dwReturn, (LPSTR) mciErr, 255);

//MessageBox(NULL, mciErr, "HCD", MB_ICONINFORMATION | MB_OK);
        }
    //
    else if(nType == HCD_MOV)
        This->cHypercd->Open(This->window,szFile,"QTWVideo");
    else
        This->cHypercd->Open(This->window,szFile,"AVIVideo");

if (This->mode == NP_FULL)
        This->cHypercd->Center();

This->cHypercd->Update();

//  if (This->bAutoStart)
        This->cHypercd->Start(This->bLoop);
    }

}

//----------------------------------------------------------------------
// NPP_Print:
//----------------------------------------------------------------------
void NP_LOADDS
NPP_Print(NPP instance, NPPrint* printInfo)
{
    DEBUG_TEST("NPP_Print")

if(printInfo == NULL)    // trap invalid parm
        return;

if (instance != NULL)
    {
        PluginInstance* This = (PluginInstance*) instance->pdata;

if (printInfo->mode == NP_FULL)
        {
            //
            // Note: If your plugin would like to take over
            // printing completely when it is in full-screen mode,
            // set printInfo->pluginPrinted to TRUE and print your
            // plugin as you see fit. If your plugin wants Netscape
            // to handle printing in this case, set printInfo->pluginPrinted
            // to FALSE (the default) and do nothing. If you do want
            // to handle printing yourself, printOne is true if the
            // print button (as opposed to the print menu) was clicked.
            // On the Macintosh, platformPrint is a THPrint; on Windows,
            // platformPrint is a structure (defined in npapi.h) containing
            // the printer name, port, etc.
            //
            void* platformPrint = printInfo->print.fullPrint.platformPrint;
            NPBool printOne = printInfo->print.fullPrint.printOne;

printInfo->print.fullPrint.pluginPrinted = FALSE; // Do the default

}
        else    // If not fullscreen, we must be embedded
        {
            //
            // Note: If your plugin is embedded, or is full-screen
            // but you returned false in pluginPrinted above, NPP_Print
            // will be called with mode == NP_EMBED. The NPWindow
            // in the printInfo gives the location and dimensions of
            // the embedded plugin on the printed page. On the Macintosh,
            // platformPrint is the printer port; on Windows, platformPrint
            // is the handle to the printing device context.
```

35

```
        //  Window                                    ,window
        NPWindow* printW    = &(printInfo->print.embedPrint.window);
        void* platformPrint  = printInfo->print.embedPrint.platformPrint;
    }
}

//-------------------------------------------------------------------------------
// NPP_HandleEvent:
// Mac-only.
//-------------------------------------------------------------------------------
int16 NPP_HandleEvent(NPP instance, void* event)
{
    NPBool eventHandled = FALSE;
    if (instance == NULL)
        return eventHandled;

PluginInstance* This = (PluginInstance*) instance->pdata;

//
    // Note: The "event" passed in is a Macintosh
    // EventRecord*. The event.what field can be any of the
    // normal Mac event types, or one of the following additional
    // types defined in npapi.h: getFocusEvent, loseFocusEvent,
    // adjustCursorEvent. The focus events inform your plugin
    // that it will become, or is no longer, the recepient of
    // key events. If your plugin doesn't want to receive key
    // events, return false when passed at getFocusEvent. The
    // adjustCursorEvent is passed repeatedly when the mouse is
    // over your plugin; if your plugin doesn't want to set the
    // cursor, return false. Handle the standard Mac events as
    // normal. The return value for all standard events is currently
    // ignored except for the key event: for key events, only return
    // true if your plugin has handled that particular key event.
    // return eventHandled;
}
```

36

```
/*------------------------------     ---------------------------------------
        File:       CHyperCD.cpp
        Advanced Features:

This file contains some basic code to play
                    and display HyperCD files.  It implements
                    a CHyperCD class which can be used to display
                    movie files.

------------------------------------------------------------------------*/ include "stdafx.h"
include "CHyperCD.h"
include <mmsystem.h> ifdef WIN32
    #include <digitalv.h>
endif ifdef _DEBUG
undef THIS_FILE
static char BASED_CODE THIS_FILE[] = __FILE__;
#endif

/*------------------------------------------------------------------------

The constructor

------------------------------------------------------------------------*/

CHyperCD::CHyperCD ()
{
    mOpen = FALSE;
    mPlaying = FALSE;
    mDeviceID = 0;
    mErrorCode = 0;
    mMCIErrorCode = 0L;
}

CHyperCD::~CHyperCD ()
{
}

/*------------------------------------------------------------------------

This function opens the HyperCD movie file for playback and display the first
frame. It requires the HyperCD movie file name and a pointer to the window to draw into

------------------------------------------------------------------------*/

BOOL CHyperCD::Open (CWnd *pWnd, CString Filename, CString Type)
{
    DWORD RetCode;
    MCI_ANIM_OPEN_PARMS OpenParms;
    MCI_ANIM_WINDOW_PARMS WindowParms;

// Close any device that is already open.
    if (mDeviceID){
        Close ();
        }

// Open a device for playback.
    OpenParms.dwCallback = NULL;
    OpenParms.wDeviceID = 0;
    OpenParms.lpstrDeviceType = Type;
    OpenParms.lpstrElementName = Filename.GetBuffer (1);
    OpenParms.lpstrAlias = "HyperCD";// can use an array of aliases
    OpenParms.dwStyle = WS_CHILD | WS_VISIBLE;
    OpenParms.hWndParent = pWnd->m_hWnd;
```

```
        DWORD flags=(DWORD) MCI_OPEN_ELEMENT | MCI_ANIM_OPEN_PARENT | MCI_ANIM_OPEN_WS;
        if(Type =="AVIVideo" || Type =="QTWVideo")
            flags |= MCI_OPEN_Type;
        if (RetCode = mciSendCommand(0, MCI_OPEN, flags, (DWORD) (LPVOID) &OpenParms)){
            mMCIErrorCode = RetCode;
            char szBuf[256];
            mciGetErrorString(RetCode,szBuf,256);
            char msg[200];
            strcpy(msg, "Error Opening : "); strcat(msg, Filename);
            MessageBox(NULL,szBuf,msg,MB_OK);
            return FALSE;
        }

// The device was opened, get the device ID.
    mDeviceID = OpenParms.wDeviceID;
    WindowParms.dwCallback = NULL;
    WindowParms.hWnd = pWnd->m_hWnd;
    WindowParms.nCmdShow = SW_SHOW;
    WindowParms.lpstrText = (LPSTR) NULL;
    if (RetCode = mciSendCommand (mDeviceID, MCI_WINDOW, MCI_ANIM_WINDOW_HWND, (DWORD) (LPVOID) &WindowParms)){
        mMCIErrorCode = RetCode;
        return FALSE;
    }
    mMovieWnd = WindowParms.hWnd;

mOpen = TRUE;
    return TRUE;
}

/*------------------------------------------------------------------------

Stop any HyperCD movie, close any open device IDs.

/*------------------------------------------------------------------------*/
void CHyperCD::Close (void)
{
    // Closing a device ID will stop the video playback.
    if (mDeviceID)
        mciSendCommand (mDeviceID, MCI_CLOSE, 0L, NULL);

mOpen = FALSE;
    mPlaying = FALSE;
} void CHyperCD::Update ()
{

MCI_ANIM_UPDATE_PARMS UpdateParams;

UpdateParams.dwCallback = NULL;
    UpdateParams.hDC = ::GetDC(mMovieWnd);
    if (mDeviceID)
        mciSendCommand (mDeviceID, MCI_UPDATE, MCI_ANIM_UPDATE_HDC, (DWORD) (LPVOID)&UpdateParams);

::ReleaseDC(mMovieWnd,UpdateParams.hDC);
    mOpen = FALSE;
    mPlaying = FALSE;
}

/*------------------------------------------------------------------------

Start the video playback.
    This function immediately returns control back to the program.

/*------------------------------------------------------------------------*/

BOOL CHyperCD::Start (BOOL bLoop)
{
    DWORD RetCode, dwFlags = 0L;
    MCI_ANIM_PLAY_PARMS PlayParms;
```

38

```
        // Start playback using the MCI_PLAY command.
        PlayParms.dwCallback = NULL;
        PlayParms.dwFrom = PlayParms.dwTo = 0;
#ifdef WIN32
        if (bLoop) dwFlags = MCI_DGV_PLAY_REPEAT;
#endif
        if (RetCode = mciSendCommand (mDeviceID, MCI_PLAY, dwFlags, (DWORD) (LPVOID) &PlayParms)){
            mMCIErrorCode = RetCode;
            char szBuf[256];
            mciGetErrorString(RetCode,szBuf,256);
            mciSendCommand (mDeviceID, MCI_CLOSE, 0L, NULL);
            mOpen = FALSE;
            return FALSE;
            }
        mPlaying = TRUE;
        return TRUE;
}

BOOL CHyperCD::Realize (void)
{
    // plugins must realize their palette as a background palette
    DWORD RetCode =
        mciSendCommand (mDeviceID, MCI_REALIZE, MCI_ANIM_REALIZE_BKGD, NULL);
    return RetCode;
}

/*-----------------------------------------------------------------------

Pause a video, different from close.

/*-----------------------------------------------------------------------*/

BOOL CHyperCD::Stop (void)
{
    DWORD RetCode;

// Stop playback by sending the MCI_PAUSE command.
    if (RetCode = mciSendCommand (mDeviceID, MCI_PAUSE, 0L, NULL)){
        mMCIErrorCode = RetCode;
        mciSendCommand (mDeviceID, MCI_CLOSE, 0L, NULL);
        mOpen = FALSE;
        return FALSE;
        } mPlaying = FALSE;
    return TRUE;
}
/*-----------------------------------------------------------------------

Rewind the video to the beginning and display the
first frame.

/*-----------------------------------------------------------------------*/

BOOL CHyperCD::Rewind (void)
{
    DWORD RetCode;

// If the video is playing you must stop it first.
    if (mPlaying)
        if (!Stop ())
            return FALSE;

// Use the MCI_SEEK command to return to the beginning of the file.
    if (RetCode = mciSendCommand (mDeviceID, MCI_SEEK, MCI_SEEK_TO_START, (DWORD) (LPVOID) NULL)){
        mMCIErrorCode = RetCode;
        mciSendCommand (mDeviceID, MCI_CLOSE, 0L, NULL);
        mOpen = FALSE;
        return FALSE;
        }
```

```
    return TRUE;
}
/*-------------------------------------------------------------------

Forward the video to the end and display the last frame.
/*-----------------------------------------------------------------*/

BOOL CHyperCD::Forward (void)
{
    DWORD RetCode;

// If the video is playing you must stop it first.
    if (mPlaying)
        if (!Stop ())
            return FALSE;

// Use the MCI_SEEK command to go to the end of the file.
    if (RetCode = mciSendCommand (mDeviceID, MCI_SEEK, MCI_SEEK_TO_END, (DWORD) (LPVOID) NULL)){
        mMCIErrorCode = RetCode;
        mciSendCommand (mDeviceID, MCI_CLOSE, 0L, NULL);
        mOpen = FALSE;
        return FALSE;
        } return TRUE;
}

/*-------------------------------------------------------------------

Forward the video by one frame.
/*-----------------------------------------------------------------*/
BOOL CHyperCD::FrameForward (void)
{
    DWORD RetCode;
    MCI_ANIM_STEP_PARMS StepParms;
    MCI_STATUS_PARMS StatusParms;
    DWORD Length, Position;

// If the video is playing you must stop it first.
    if (mPlaying)
        if (!Stop ())
            return FALSE;

// Determine the length in frames of the file.
    StatusParms.dwItem = MCI_STATUS_LENGTH;
    if (RetCode = mciSendCommand (mDeviceID, MCI_STATUS, MCI_STATUS_ITEM, (DWORD) (LPVOID) &StatusPa
rms)){
        mMCIErrorCode = RetCode;
        mciSendCommand (mDeviceID, MCI_CLOSE, 0L, NULL);
        return FALSE;
        }
    Length = StatusParms.dwReturn;

// Determine the current position of the file.
    StatusParms.dwItem = MCI_STATUS_POSITION;
    if (RetCode = mciSendCommand (mDeviceID, MCI_STATUS, MCI_STATUS_ITEM, (DWORD) (LPVOID) &StatusPa
rms)){
        mMCIErrorCode = RetCode;
        mciSendCommand (mDeviceID, MCI_CLOSE, 0L, NULL);
        return FALSE;
        }
    Position = StatusParms.dwReturn;

// If we're already at the end return.
    if (Length == Position)
        return TRUE;

// If not already at the end use MCI_STEP to move forward one frame.
    StepParms.dwFrames = 1L;
    if (RetCode = mciSendCommand (mDeviceID, MCI_STEP, MCI_ANIM_STEP_FRAMES, (DWORD) (LPVOID) &StepP
```

```
arms)){
        mMCIErrorCode = RetCode;
        mciSendCommand (mDeviceID, MCI_CLOSE, 0L, NULL);
        mOpen = FALSE;
        return FALSE;
        } return TRUE;
}

/*-------------------------------------------------------------------------

Step back the video by one frame.

/*-----------------------------------------------------------------------*/

BOOL CHyperCD::FrameBack (void)
{
    DWORD RetCode;
    MCI_ANIM_STEP_PARMS StepParms;

// If the video is playing you must stop it first.
    if (mPlaying)
        if (!Stop ())
            return FALSE;

// Use MCI_STEP to move back one frame.
    StepParms.dwFrames = 1L;
    if (RetCode = mciSendCommand (mDeviceID, MCI_STEP, MCI_ANIM_STEP_REVERSE, (DWORD) (LPVOID) &StepParms)){
        mMCIErrorCode = RetCode;
        mciSendCommand (mDeviceID, MCI_CLOSE, 0L, NULL);
        mOpen = FALSE;
        return FALSE;
        } return TRUE;
}

DWORD CHyperCD::GetLength (void)
{
    DWORD RetCode;
    // Make sure a device is open.
    if (!mDeviceID)
        return 0;

MCI_STATUS_PARMS StatusParms;

// Determine the length in frames of the file.
    StatusParms.dwItem = MCI_STATUS_LENGTH;
    if (RetCode = mciSendCommand (mDeviceID, MCI_STATUS, MCI_STATUS_ITEM, (DWORD) (LPVOID) &StatusParms)){
        mMCIErrorCode = RetCode;
        mciSendCommand (mDeviceID, MCI_CLOSE, 0L, NULL);
        return FALSE;
        }
    return (int) StatusParms.dwReturn;
}

DWORD CHyperCD::GetPosition (void)
{
    DWORD RetCode;
    // Make sure a device is open.
    if (!mDeviceID)
        return 0;

MCI_STATUS_PARMS StatusParms;

// Determine the current position of the file.
    StatusParms.dwItem = MCI_STATUS_POSITION;
    if (RetCode = mciSendCommand (mDeviceID, MCI_STATUS, MCI_STATUS_ITEM, (DWORD) (LPVOID) &StatusParms)){
        mMCIErrorCode = RetCode;
```

```
        mciSendCommand (mDeviceID, MCI_CLOSE, 0L, NULL);
        return FALSE;
    }
    return (int) StatusParms.dwReturn;
} int CHyperCD::GetWidth (void)
{
    // Make sure a device is open.
    if (!mDeviceID)
        return 0;

MCI_ANIM_RECT_PARMS RectParms;

// Use MCI_WHERE to get the video window rectangle.
    mciSendCommand (mDeviceID, MCI_WHERE, (DWORD) MCI_ANIM_WHERE_SOURCE, (DWORD) (LPVOID) &RectParms
);

return (int) RectParms.rc.right;
} int CHyperCD::GetHeight (void)
{
    // Make sure a device is open.
    if (!mDeviceID)
        return 0;

MCI_ANIM_RECT_PARMS RectParms;

// Use MCI_WHERE to get the video window rectangle.
    mciSendCommand (mDeviceID, MCI_WHERE, (DWORD) MCI_ANIM_WHERE_SOURCE, (DWORD) (LPVOID) &RectParms
);

return (int) RectParms.rc.bottom;
}

CString CHyperCD::GetErrorString (void)
{
    static const char *Strings[] = {
        "Could not set the position for the video in the window.",
    };
    char ErrorBuffer[MAXERRORLENGTH];

// An error was generated from within the CHyperCD class.
    if (mErrorCode == 1)
        return (CString) Strings[0];
    // An error was generated from a MCI function call.
    else if (mciGetErrorString (mMCIErrorCode, (LPSTR) ErrorBuffer, MAXERRORLENGTH))
        return (CString) ErrorBuffer;
    // There is no error.
    else
        return (CString) ("There is no error or the error is undefined.");
}
/*---------------------------------------------------------------------

A private function that simply positions the video window in the
center of the parent window.

/*---------------------------------------------------------------------*/
BOOL CHyperCD::Center (void)
{
    DWORD RetCode;
    CRect BoundsRect, MovieRect, WindowRect;
    MCI_ANIM_RECT_PARMS RectParms;

// Use MCI_WHERE to get the video window rectangle.
    if (RetCode = mciSendCommand (mDeviceID, MCI_WHERE, (DWORD) MCI_ANIM_WHERE_SOURCE, (DWORD) (LPVO
ID) &RectParms))
        return FALSE;
```

```
    // Determine the parameters for the playback window.
    BoundsRect = RectParms.rcy
    MovieRect.left = 0;
    MovieRect.top = 0;
    MovieRect.right = MovieRect.left + BoundsRect.right;
    MovieRect.bottom = MovieRect.top + BoundsRect.bottom;

::GetWindowRect(mMovieWnd,&WindowRect);

// Move the playback window.
    MoveWindow (mMovieWnd, (WindowRect.Width() - MovieRect.Width())/2,
                           (WindowRect.Height() - MovieRect.Height())/2,
                           BoundsRect.right, BoundsRect.bottom, TRUE);

return TRUE;
}
```

While a specific embodiment of the invention has been shown and described, it is to be understood that numerous changes and modifications may be made therein without departing from the scope, spirit and intent of the invention as set forth in the appended claims.

What I claim is:

1. A method of transmitting data invoking a crippled file on a storage medium containing video and/or audio over a network, comprising:
   (a) converting analog video and/or audio data into digital data;
   (b) crippling the video and/or audio files on the storage medium by removing selected information therefrom, whereupon the files are rendered unusable without an uncrippling trigger;
   (c) storing the digital data representing the video and/or audio on a storage medium for use by an end user's computer means;
   (d) storing uncrippling trigger data comprising the selected information at a host computer means for use in uncrippling the data files on the storage medium;
   (e) transmitting the uncrippling trigger data from the host computer means through a network to the end-user's computer means with which the storage medium having the crippled data files thereon is associated;
   (f) receiving the uncrippling trigger data at the end-user's computer means in the volatile RAM of the end-user's computer means; and
   (g) substantially instantly uncrippling the crippled data files on the storage medium by means of combining in RAM the uncrippling trigger data sent by the host computer means in said step (e) with the crippled data on the storage medium;
   (h) before said step (e), encrypting the uncrippling trigger data into encoded data; and
   (i) after said step (f), decrypting the encrypted data;
   step (g) being carried out immediately after said step (f), and, immediately after said step (g), playing the video and/or audio on a player means;
   said step (f) comprising:
   1) directing the incoming uncrippling trigger data to RAM for temporary storage therein;
   2) combining in RAM said uncrippling trigger data with said crippled video and/or audio files; and
   3) preventing the copying thereof to nonvolatile memory; said step (g) being performed while said uncrippling data is in said RAM for immediate playback of said video and/or audio files on said storage medium.

2. The method of transmitting data invoking a crippled file on a storage medium containing video and/or audio over the Internet, according to claim 1, wherein said step (f) comprises catching the uncrippling trigger data for the crippled data files, and directing the encoded trigger data to a specific cache directory of the end-user computer means.

3. The method of transmitting data invoking a crippled file on a storage medium containing video and/or audio over the Internet, according to claim 1, wherein said step (c) comprises removing the header data from the video/audio files; said step (d) comprising storing the header data representing the header data removed from the video/audio files in said step (c).

4. The method of transmitting data invoking a crippled file on a storage medium containing video and/or audio over the Internet, according to claim 1, wherein said step (h) comprises converting binary data into seven-digit ASCII code.

5. The method of transmitting data invoking a crippled file on a storage medium containing video and/or audio over the Internet, according to claim 1, said step of playing comprising converting the digital binary data back into analogue.

6. The method of transmitting data invoking a crippled file on a storage medium containing video and/or audio over the Internet, according to claim 1, wherein said storage medium comprises memory means for representing the necessary information for automatically and directly connecting via the Internet the end-user's computer, with which the storage medium is associated, to a host computer which stores the uncrippling trigger data for the video/audio files on the storage medium.

7. The method of transmitting data invoking a crippled file on a storage medium containing video and/or audio over the Internet, according to claim 1, further comprising:
   (j) allowing, by server-permission only, the end-user the ability to store said trigger on non-volatile media for permanent ownership of said data.

8. A method of transmitting data invoking a crippled file from which selected information has been removed, on a storage medium containing video and/or audio data over the Internet, comprising:
   (a) storing uncrippling trigger data comprising said selected information at a host computer for use in uncrippling video/audio files on a storage medium;
   (b) encrypting and transmitting the uncrippling trigger data from the host computer through the Internet to the end-user's computer with which the storage medium having the crippled files thereon is associated;
   (c) receiving and decrypting the uncrippling trigger data at the end-user's computer over the Internet;
   (d) immediately after said step (c), uncrippling the crippled data files on the storage medium by means of the uncrippling trigger data sent by the host computer in said step (b);
   (e) immediately after said step (d), playing the video and/or audio on a player;
   said step (c) comprising directing the incoming uncrippling trigger data to volatile RAM for temporary storage therein, combining in RAM said trigger data with said crippled file, and preventing the copying thereof to nonvolatile memory; said step (d) being performed while said uncrippling data is in said volatile RAM for immediate playback of said video and/or audio files by said step (e).

9. The method of transmitting data invoking a crippled file on a storage medium containing video and/or audio data over the Internet, according to claim 8, wherein said step (c) comprises catching the uncrippling trigger data for the crippled data files and retrieving the encrypted data to a specific cache-directory location of the end-user computer from the remote server into the end-user's RAM for immediate playback by said step (e).

10. The method of transmitting data invoking a crippled file on a storage medium containing video and/or audio data over the Internet, according to claim 8, wherein before said step (a), removing the header data from the video/audio files; said step (d) comprising restoring the header data representing the header data removed from the video/audio files.

11. The method of transmitting data invoking a crippled file on a storage medium containing video and/or audio data over the Internet, according to claim 8, wherein said step (b) comprises encrypting the uncrippling trigger data from binary format into encoded text format data.

12. The method of transmitting data invoking a crippled file on a storage medium containing video and/or audio data over the Internet, according to claim 8, wherein said steps (c) and (d) are carried out substantially simultaneously so that said step (e) plays back the video and/or audio data substantially immediately after said step (d).

13. The method of transmitting data invoking a crippled file on a storage medium containing video and/or audio over the Internet, according to claim 8, wherein said storage medium comprises memory means for representing the necessary information for automatically and directly connecting via the Internet the end-user's computer, said method further comprising before said step (a), automatically and directly connecting the end user's computer to the host computer which has stored thereat the uncrippling trigger data for the video/audio files on the storage medium by means of the memory means of the storage medium for representing the necessary information for automatically and directly connecting via the Internet.

14. The method of transmitting data invoking a crippled file on a storage medium containing video and/or audio over the Internet, according to claim 8, wherein said step (a) comprises storing at least one of the following: Video/audio header data; data for removing the hidden-status flag for the video/audio data files on the storage medium; data for unzipping the zipped data files of the video/audio data files on storage medium; data for changing the extension of the video/audio data files.

15. The method of transmitting data invoking a crippled file on a storage medium containing video and/or audio over the Internet, according to claim 8, wherein said storage medium comprises at least one of: CD-ROM, floppy disk, and hard drive.

16. The method of transmitting data invoking a crippled file on a storage medium containing video and/or audio over the Internet, according to claim 9, further comprising permanently storing the incoming uncrippling trigger data in ROM of the end-user's computer, for repeatedly uncrippling the crippled file when the playing thereof is required.

17. In a storage device, for use with a computer, which storage device comprises memory means for storing digital data thereon, the improvement comprising:

said memory means comprising crippled data files representative of video and/or audio; said crippled data files being crippled by removal of selected data therefrom;

said crippled data files of said memory means being encrypted;

an end-user's computer for use in playing back the crippled and encrypted data files on the storage device;

a host computer having a memory means for storing encrypted uncrippling data comprising said selected data thereon for said crippled, encrypted data files on said storage device;

a network system linking said end-user's computer with said host computer, whereupon said host computer's sending said uncrippling encrypted data stored in said memory means thereof to said end-user's computer, said crippled data files on said storage device, associated with said end-user's computer is uncrippled in the RAM of the end-users's computer and rendered playable after being decrypted;

said end-user's computer comprising means for decrypting said encrypted uncrippling triggering data and said encrypted crippled data files of said storage device; volatile memory means for receiving said encrypted uncrippling triggering data; means for immediately joining said decrypted uncrippling triggering data and said decrypted data files of said storage device in said RAM, for immediate playback of said data files;

said end-user's computer further comprising player means for playing back the decrypted, uncrippled data files;

said means for immediately joining said decrypted uncrippling triggering data and said decrypted data files of said storage device, for immediate playback of said data files comprising means for preventing the copying of said uncrippling triggering data sent from said host computer to nonvolatile memory.

18. The storage device for use with a computer according to claim 17, wherein said removed selected data from said crippled data files comprises audio/video header information.

19. The storage device for use with a computer according to claim 17, said wherein said storage device comprises CD-ROM means.

* * * * *

UNITED STATES PATENT AND TRADEMARK OFFICE
CERTIFICATE OF CORRECTION

PATENT NO. : 5,892,825
DATED : April 6, 1999
INVENTOR(S) : Kenneth G. Mages; Jie Feng It is certified that error appears in the above-identified patent and that said Letters Patent is hereby corrected as shown below:

On the title page, item [73] Assignee, should read--

Assignee: HyperLOCK Technologies, Inc., Skokie, Ill. --;

Column 9, before line 40,
--COPYRIGHT 1996 - HYPERLOCK TECHNOLOGIES, INC. -- should be inserted;

Column 15, at the end of the software listing,
--COPYRIGHT 1996 - HYPERLOCK TECHNOLOGIES, INC. -- should be inserted;

Column 57, at the end of the software listing,
COPYRIGHT 1996 - HYPERLOCK TECHNOLOGIES, INC. -- should be inserted.

Signed and Sealed this

Twenty-first Day of March, 2000

Attest:

Attesting Officer

Q. TODD DICKINSON

Commissioner of Patents and Trademarks